US006567574B1

(12) United States Patent
Ma et al.

(10) Patent No.: US 6,567,574 B1
(45) Date of Patent: May 20, 2003

(54) MODULAR THREE-DIMENSIONAL OPTICAL SWITCH

(75) Inventors: Jian Ma, San Diego, CA (US); Ezekiel John Joseph Kruglick, San Diego, CA (US); Daniel J. Reiley, San Diego, CA (US); Philippe Jean Marchand, Poway, CA (US); Steffen Gloeckner, San Diego, CA (US)

(73) Assignee: Omm, Inc., San Diego, CA (US)

( * ) Notice: Subject to any disclaimer, the term of this patent is extended or adjusted under 35 U.S.C. 154(b) by 0 days.

(21) Appl. No.: 09/680,648

(22) Filed: Oct. 6, 2000

(51) Int. Cl.⁷ .................................................. G02B 6/26

(52) U.S. Cl. .............................. 385/16; 385/18; 385/19

(58) Field of Search ...................................... 385/16–20

(56) References Cited

U.S. PATENT DOCUMENTS

| 3,430,057 A | 2/1969 | Genahr |
| 3,896,362 A | 7/1975 | Street .......................... 318/640 |
| 4,003,655 A | 1/1977 | Wasilko .......................... 356/4 |
| 4,208,094 A | 6/1980 | Tomlinson |
| 4,234,145 A | 11/1980 | Leiboff ....................... 244/3.16 |
| 4,256,927 A | 3/1981 | Treheux et al. ............... 179/18 |
| 4,303,303 A | 12/1981 | Aoyama .................... 350/96.2 |

(List continued on next page.)

FOREIGN PATENT DOCUMENTS

| EP | 0510629 | 10/1992 | |
| EP | 0880040 | 11/1998 | ............ G02B/6/26 |
| EP | 0902538 | 3/1999 | |
| EP | 0903607 | 3/1999 | ........... G02B/26/08 |
| EP | 0921702 | 6/1999 | |
| EP | 0902538 | 12/1999 | ......... H03K/17/968 |

(List continued on next page.)

OTHER PUBLICATIONS

Huja, Martin, "MEMS Structure—Micromirror Array," Proceedings of SPIE/vol. 4019, p. 556–566.

Boissier, Alain, "Space division optical switching system of medium capacities," Proceedings: Fiber Optic Broadband Networks, p. 65–70.

Laor, Herzel, "New Optical Switch Development," 7th European Conference on Optical Communication, Sep. 8–11, 1981 Bella Center.

Bright, Victor M., "Selected Papers on Optical MEMS," SPIE Milestone Series, vol. MS 153.

(List continued on next page.)

*Primary Examiner*—Ellen E. Kim
(74) *Attorney, Agent, or Firm*—Arien Ferrell; Fitch, Even, Tabin & Flannery

(57) ABSTRACT

A modular three-dimensional (3D) optical switch that is scalable and that provides monitor and control of MEMS mirror arrays. A first switch module includes an array of input channels. Light beams received from the input channels are directed toward a first wavelength selective mirror. The light beams are reflected off of the first wavelength selective mirror and onto a first array of moveable micromirrors. The moveable micromirrors are adjusted so that the light beams reflect therefrom and enter a second switch module where they impinge upon a second array of moveable micromirrors. The light beams reflect off of the second array of moveable micromirrors and impinge upon a second wavelength selective mirror. The light beams reflect off of the second wavelength selective mirror and into an array of output channels. The alignment or misalignment of a data path through the switch is detected by directing two monitor beams through the data path, one in the forward direction and one in the reverse direction. The position of each of the monitor beams is detected after its reflection from the second moveable micromirror that it hits. The position data is used to determine the angles of the moveable micromirrors in the data path.

71 Claims, 14 Drawing Sheets

U.S. PATENT DOCUMENTS

| | | | |
|---|---|---|---|
| 4,317,611 A | 3/1982 | Peterson | |
| 4,322,126 A | 3/1982 | Minowa et al. | 350/96.2 |
| 4,365,863 A | 12/1982 | Broussaud | |
| 4,431,258 A | 2/1984 | Fye | 350/1.6 |
| 4,470,662 A | 9/1984 | Mumzhiu | 350/96.15 |
| 4,534,615 A | 8/1985 | Iwasaki | 350/6.1 |
| 4,566,935 A | 1/1986 | Hornbeck | |
| 4,596,992 A | 6/1986 | Hornbeck | |
| 4,626,066 A | 12/1986 | Levinson | |
| 4,630,883 A | 12/1986 | Taylor | |
| 4,662,746 A | 5/1987 | Hornbeck | |
| 4,710,732 A | 12/1987 | Hornbeck | |
| 4,796,263 A | 1/1989 | Rampolla | 372/10 |
| 4,932,745 A | 6/1990 | Blonder | |
| 4,956,619 A | 9/1990 | Hornbeck | |
| 4,989,941 A | 2/1991 | Soref | |
| 5,028,939 A | 7/1991 | Hornbeck | |
| 5,037,173 A | 8/1991 | Sampsell | |
| 5,096,279 A | 3/1992 | Hornbeck | |
| 5,168,535 A | 12/1992 | Laor | 385/16 |
| 5,172,262 A | 12/1992 | Hornbeck | |
| 5,177,348 A | 1/1993 | Laor | |
| 5,199,088 A | 3/1993 | Magel | |
| 5,247,593 A | 9/1993 | Lin | |
| 5,256,869 A | 10/1993 | Lin | |
| 5,283,844 A | 2/1994 | Rice et al. | 385/17 |
| 5,291,324 A | 3/1994 | Hinterlong | 359/135 |
| 5,311,410 A | 5/1994 | Hsu | |
| 5,317,659 A | 5/1994 | Lee | |
| 5,410,371 A | 4/1995 | Lambert | |
| 5,412,506 A | 5/1995 | Feldblum | |
| 5,420,946 A | 5/1995 | Tsai | |
| 5,436,986 A | 7/1995 | Tsai | |
| 5,440,654 A | 8/1995 | Lambert, Jr. | |
| 5,444,801 A | 8/1995 | Laughlin | |
| 5,522,796 A | 6/1996 | Dorsey, III | 604/118 |
| 5,524,153 A | 6/1996 | Laor | |
| 5,621,829 A | 4/1997 | Ford | |
| 5,627,669 A | 5/1997 | Orino | |
| 5,646,928 A | 7/1997 | Wu | |
| 5,647,033 A | 7/1997 | Laughlin | |
| 5,661,591 A | 8/1997 | Lin | |
| 5,748,812 A * | 5/1998 | Buchin | 385/18 |
| 5,774,604 A | 6/1998 | McDonald | |
| 5,786,925 A | 7/1998 | Goossen et al. | 359/245 |
| 5,808,780 A | 9/1998 | McDonald | 359/290 |
| 5,841,917 A | 11/1998 | Jungerman et al. | 385/17 |
| 5,867,297 A | 2/1999 | Kiang et al. | 359/198 |
| 5,878,177 A | 3/1999 | Karasan | |
| 5,903,687 A | 5/1999 | Young | |
| 5,914,801 A | 6/1999 | Dhuler | |
| 5,923,798 A | 7/1999 | Aksyuk et al. | 385/19 |
| 5,933,269 A | 8/1999 | Robinson | 359/280 |
| 5,943,454 A | 8/1999 | Aksyuk et al. | 385/22 |
| 5,963,367 A | 10/1999 | Aksyuk | |
| 5,969,465 A | 10/1999 | Neukermans et al. | 310/333 |
| 5,994,159 A | 11/1999 | Aksyuk et al. | 438/52 |
| 5,995,688 A | 11/1999 | Aksyuk et al. | 385/14 |
| 6,002,818 A | 12/1999 | Fatehi | |
| 6,031,946 A | 2/2000 | Bergmann | |
| 6,031,947 A | 2/2000 | Laor | |
| 6,044,705 A | 4/2000 | Neukermans | |
| 6,087,747 A | 7/2000 | Dhuler et al. | 310/90 |
| 6,097,858 A | 8/2000 | Laor | |
| 6,097,860 A | 8/2000 | Laor | |
| 6,101,299 A * | 8/2000 | Laor | 385/16 |
| 6,123,985 A | 9/2000 | Robinson | |
| 6,134,031 A | 10/2000 | Nishi | |
| 6,134,042 A | 10/2000 | Dhuler | |
| 6,137,103 A | 10/2000 | Giles | |
| 6,137,105 A | 10/2000 | Drobot | |
| 6,137,926 A | 10/2000 | Maynard | |
| 6,154,583 A | 11/2000 | Kuroyanagi | |
| 6,154,585 A | 11/2000 | Copner | |
| 6,157,026 A | 12/2000 | Redmer | |
| 6,160,930 A | 12/2000 | Ferguson | |
| 6,188,814 B1 | 2/2001 | Bhalla | |
| 6,195,190 B1 | 2/2001 | Tachibe | |
| 6,198,180 B1 | 3/2001 | Garcia | |
| 6,198,565 B1 | 3/2001 | Iseki | |
| 6,201,629 B1 | 3/2001 | McClelland | |
| 6,204,946 B1 | 3/2001 | Aksyuk | |
| 6,219,133 B1 | 4/2001 | Kawase | |
| 6,219,168 B1 | 4/2001 | Wang | |
| 6,219,472 B1 | 4/2001 | Horino | |
| 6,222,954 B1 | 4/2001 | Riza | |
| 6,320,993 B1 * | 11/2001 | Laor | 385/16 |
| 6,327,398 B1 * | 12/2001 | Solgaard et al. | 385/17 |

FOREIGN PATENT DOCUMENTS

| | | | |
|---|---|---|---|
| EP | 0962796 | 12/1999 | |
| EP | 1033601 | 9/2000 | |
| EP | 1039325 | 9/2000 | |
| EP | 1061389 | 12/2000 | |
| EP | 1067421 | 1/2001 | |
| WO | WO 9304388 | 3/1993 | |
| WO | WO 96/24870 | 8/1996 | |
| WO | 9624870 | 8/1996 | G02B/6/26 |
| WO | 0880040 | 2/1999 | G02B/6/26 |
| WO | WO 99/63374 | 12/1999 | |
| WO | WO 99/63531 | 12/1999 | |
| WO | WO 99/66354 | 12/1999 | |
| WO | 9966354 | 12/1999 | |
| WO | WO 99/67666 | 12/1999 | |
| WO | 9967666 | 12/1999 | G02B/6/26 |
| WO | WO 00/05832 | 2/2000 | |
| WO | WO 00/20899 | 4/2000 | |
| WO | 0020899 | 4/2000 | |
| WO | WO 00/25161 | 5/2000 | |
| WO | WO 00/68719 | 11/2000 | |
| WO | WO 00/73839 | 12/2000 | |
| WO | WO 00/75711 | 12/2000 | |
| WO | WO 00/77556 | 12/2000 | |
| WO | WO 01/06543 | 1/2001 | |
| WO | WO 01/07945 | 2/2001 | |
| WO | WO 01/13151 | 2/2001 | |
| WO | WO 01/24384 | 4/2001 | |
| WO | WO 01/25848 | 4/2001 | |
| WO | WO 01/27682 | 4/2001 | |

OTHER PUBLICATIONS

Fujita, Hiroyuki, "Application of micromachining technology to optical devices and systems," SPIE/vol. 2879, p. 2–11.

Dewa, Andrew S., "Development of a Silicon Two–Axis Micromirror for an Optical Cross–Connect," Solid–State Sensor and Actuator Workshop, p. 93–96.

Vdovin, Gleb, "Micromachined adaptive mirrors," Laboratory of Electronic Instrumentation, Delft University of Technology.

Hornbeck, Larry J., "Deformable–Mirror Spatial Light Modulators," SPIE Critical Reviews Series/vol. 1150, p. 86–102.

Fan, Li, "," Thesis, p. 1–134.

W. Piyawattanametha, "MEMS Technology for Optical Crosslinks for Micro/Nano Satellites," *International Conference on Integrated Nano/Microtechnology for Space Applications*, Houston, TX, Nov. 1–6, 1998, pp. 1–2.

L. Fan, "Two–Dimensional Optical Scanner with Large Angular Rotation Realized by Self–Assembled Micro–Elevator," *Proc. IEEE LEOS Summer Topical Meeting on Optical MEMS*, paper WB4, Monterey, CA, Aug. 20–22, 1998, pp. 1–8.

* cited by examiner

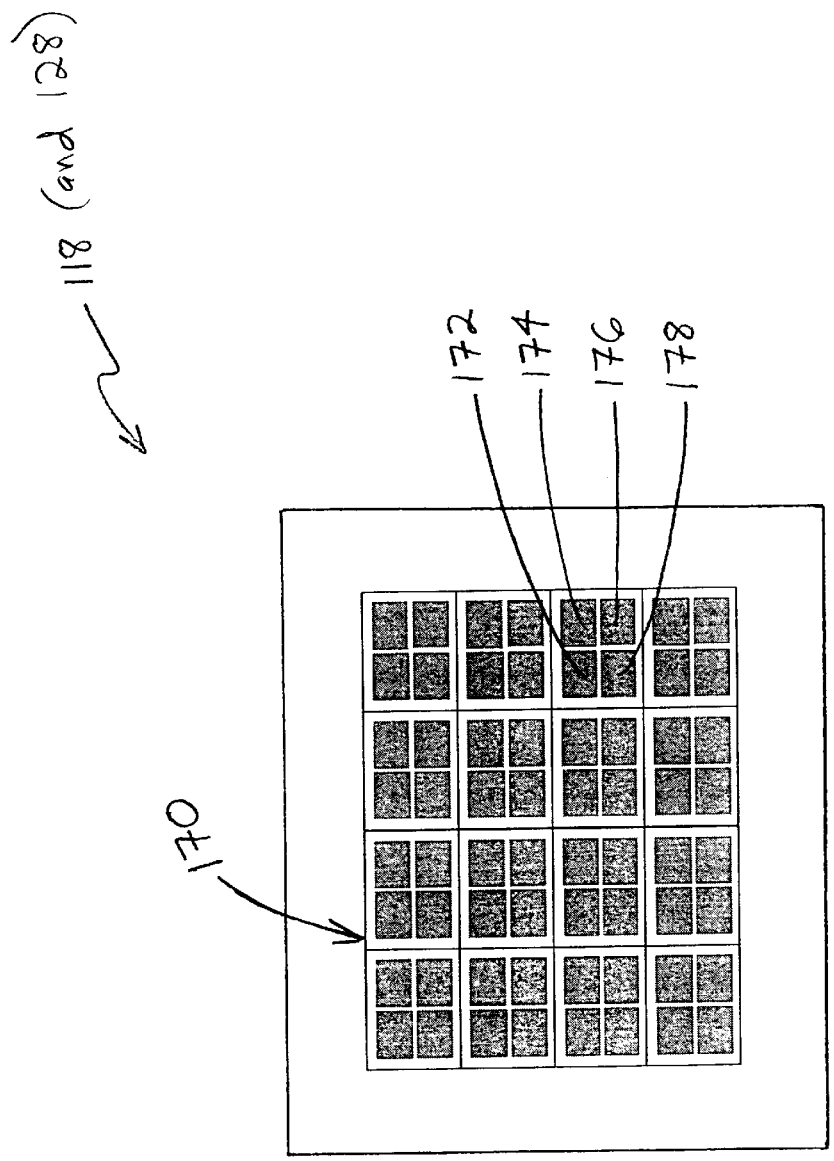

MODULAR THREE-DIMENSIONAL OPTICAL SWITCH

BACKGROUND OF THE INVENTION

1. Field of the Invention

The present invention relates generally to the field of optical switching. More specifically, the present invention relates to micro electro mechanical systems (MEMS) technology scanning mirrors for optical cross-connects and switches.

2. Discussion of the Related Art

Optical switching plays an important role in telecommunication networks, optical instrumentation, and optical signal processing systems. Optical switches can be used to turn the light output of an optical fiber on or off, or, alternatively, to redirect the light to various different fibers, all under electronic control.

Optical switches that provide switchable cross connects between an array of input fibers and an array of output fibers are often referred to as "optical cross-connects". Optical cross-connects are a fundamental building block in the development of an all-optical communications network. Specifically, in a fiber-optic communications network that uses electronic cross-connects, data travels through many fiber-optic segments which are linked together using the electronic cross-connects. Information is converted from light into an electronic signal, routed to the next circuit pathway, then converted back into light as it travels to the next network destination. In an all-optical communications network, on the other hand, the electronic cross-connects are replaced with optical cross-connects, which eliminates the need to convert the signals between light and electronic form. Instead, information travels through the entire network in the form of light, which significantly increases the network's ability to handle higher transmission speeds, reduces power dissipation, increases reliability, and reduces cost because the cost of the electrical devices are eliminated.

There are many different types of optical switches. In terms of the switching mechanism, optical switches have been previously categorized as belonging to one of two general classes. The first general class of optical switches employs a change of refractive index to perform optical switching and can be referred to as "integrated optical switches" or "electro-optic switches." The refractive index change can be induced by electro-optic, thermal-optic, acousto-optic, or free-carrier effects. The second general class of optical switches may be referred to as "bulk optomechanical switches" or simply "optomechanical switches." Such switches employ physical motion of one, or more, optical elements to perform optical switching. Specifically, an input fiber, typically engaged to a lens, is physically translatable from a first position to at least a second position. In each position, the input fiber optically connects with a different output fiber. In this way, a spatial displacement of a reflected beam is affected.

Optomechanical switches offer many advantages over electro-optic switches. Optomechanical switches have both lower insertion loss and lower crosstalk compared to electro-optic switches. Further, optomechanical switches have a high isolation between their ON and OFF states. Furthermore, optomechanical switches are bidirectional, and are independent of optical wavelength, polarization, and data modulation format. An optomechanical switch can be implemented either in a free-space approach or in a waveguide (e.g., optical fiber) approach. The free-space approach is more scalable, and offers lower coupling loss compared to the waveguide approach.

A number of different micromachining technologies have been developing. Recently, a micromachining technology known has micro electro mechanical systems (MEMS) technology has been shown to offer many advantages for building optomechanical switches. MEMS technology is technology characteristic of sizes from a few millimeters to hundreds of micrometers. MEMS technology is similar to semiconductor electronics fabrication except that the resulting devices possess mechanical functionality, as well as electronic and/or optical functionality. MEMS technology is currently used to fabricate movable microstructures and microactuators. MEMS can significantly reduce the size, weight and cost of optomechanical switches. The switching time can also be reduced because of the lower mass of the smaller optomechanical switches.

Many MEMS optomechanical switches and cross-connects employ movable micromirrors. MEMS movable micromirror assemblies may be used for optical scanning. That is, MEMS mirror assemblies may be used to rapidly traverse a range of positions in a coordinate axis. Thus, MEMS mirror assemblies may be used as a basic building block for optical scanners. Optical scanners are ideal for use in optical cross-connects. Optical scanners function by changing the angle of the optical beam with respect to the information medium. Various different types of scanners are capable of operating in one dimension (1D), two dimensions (2D), or even three dimensions (3D).

A 2D optical cross-connect (or switch) can be constructed by using MEMS micromirrors that move in only 1D. For example, by using vertical micromirrors, where the mirror surface is perpendicular to the substrate, a simple cross-connect (or matrix switch) with a regular planar array of switching cells can be realized. The input and output fibers are arranged in the same plane as the matrix substrate. When a switching or cross-connect operation is performed, the optical beam is redirected by one or more of the vertical micromirrors, but the optical beam does not leave the common plane of the input and output fibers. Thus, the vertical micromirrors move in 1D and are used to perform optical cross-connections in 2D.

A disadvantage of 2D optical cross-connects (or switches) is that they are limited in the number of input and output fibers that they can support since those fibers are arranged in the same plane as the matrix substrate. In today's rapidly expanding communications systems there is a strong demand for higher capacity optical switches. Thus, there is a need for optical cross-connects and switches that can support a greater number of input and output fibers and that have the ability to cross-connect any of the input fibers with any of the output fibers.

SUMMARY OF THE INVENTION

The present invention advantageously addresses the needs above as well as other needs by providing a method of detecting alignment of an optical path through an optical switch. The method includes the steps of: directing a first monitor beam in a forward direction along at least a portion of the optical path, the at least a portion of the optical path including reflection off of a first moveable optical redirecting device and a second moveable optical redirecting device; detecting a position of the first monitor beam that is reflected off of the second moveable optical redirecting device; directing a second monitor beam in a reverse direction along the at least a portion of the optical path; and detecting a position of the second monitor beam that is reflected off of the first moveable optical redirecting device.

The present invention also provides a method of switching an optical input channel to an optical output channel. The method includes the steps of: directing a light beam that originates from the optical input channel toward a first moveable optical redirecting device; reflecting the light beam off of the first moveable optical redirecting device and onto a second moveable optical redirecting device; reflecting the light beam off of the second moveable optical redirecting device; directing the light beam reflected off of the second moveable optical redirecting device into the optical output channel; and directing a first monitor beam along at least a portion of a same path traveled by the light beam.

The present invention also provides a method of switching an optical input channel to an optical output channel that includes the steps of: directing a light beam received from the optical input channel toward a first wavelength selective optical redirecting device; reflecting the light beam off of the first wavelength selective optical redirecting device and onto a first moveable optical redirecting device; adjusting the first moveable optical redirecting device so that the light beam reflects therefrom and impinges upon a second moveable optical redirecting device; adjusting the second moveable optical redirecting device so that the light beam reflects therefrom and impinges upon a second wavelength selective optical redirecting device; and reflecting the light beam off of the second wavelength selective optical redirecting device and into the optical output channel.

The present invention also provides an apparatus for use in optical switching. The apparatus includes a first switch module and a second switch module. The first switch module includes an optical input channel, a first moveable optical redirecting device, and a first wavelength selective optical redirecting device positioned to reflect a light beam received from the optical input channel onto the first moveable optical redirecting device. The second switch module includes an optical output channel, a second moveable optical redirecting device, and a second wavelength selective optical redirecting device positioned to reflect the light beam received from the second moveable optical redirecting device into the optical output channel. The first switch module and the second switch module are positioned so that the light beam can be reflected from the first moveable optical redirecting device and impinge upon the second moveable optical redirecting device.

The present invention also provides an apparatus for use in optical switching that includes a first switch module. The first switch module includes an optical input channel, a first moveable optical redirecting device, and a first wavelength selective optical redirecting device positioned to reflect a light beam received from the optical input channel onto the first moveable optical redirecting device. A detector is configured to detect a position of a first monitor beam that is reflected off of the first moveable optical redirecting device and that at least a portion of which is transmitted through the first wavelength selective optical redirecting device.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof presented in conjunction with the following drawings herein;

FIG. 7 is a top view illustrating one of the monitoring (detector) chips shown in FIG. 1;

DETAILED DESCRIPTION OF A PREFERRED EMBODIMENT

The following description is not to be taken in a limiting sense, but is made for the purpose of describing one or more embodiments of the invention. The scope of the invention should be determined with reference to the claims.

Figure 1:
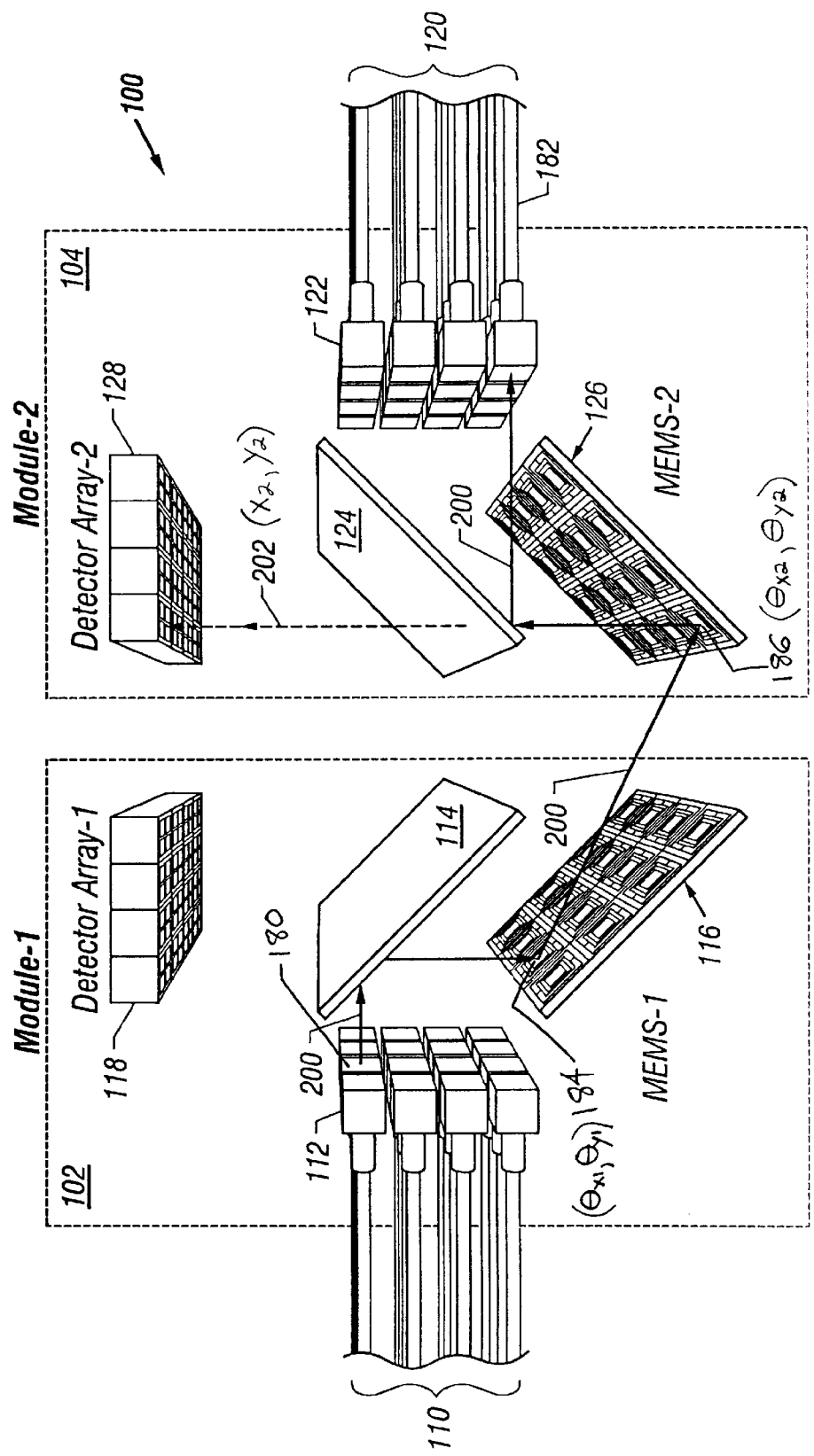
FIG. 1 is a perspective view illustrating a modular optical switch made in accordance with the present invention.
Figure 2:
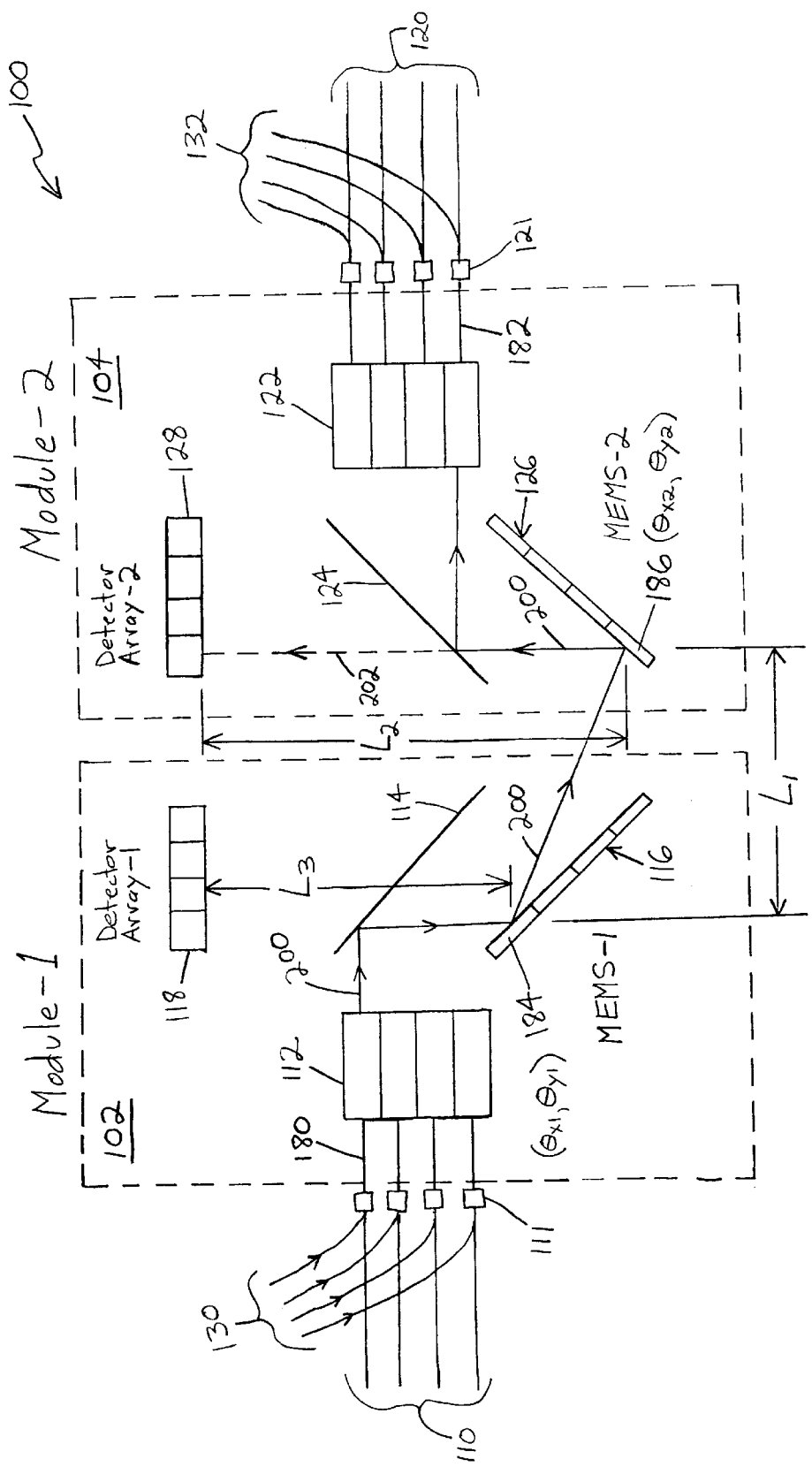
FIG. 2 is a schematic, side view illustrating the modular optical switch shown in FIG. 1.

Referring to FIGS. 1 and 2, there is illustrated an optical switch 100 made in accordance with an embodiment of the present invention. The optical switch 100 is a three-dimensional (3D) optical switch that is capable of providing switchable cross connects between an array of input fibers and an array of output fibers. In other words, each of a plurality of single-wavelength optical input channels from the input fibers can be directed to a desired optical through channel of the output fibers.

Because the optical switch 100 (or optical cross-connect 100) is a 3D switch, there are multiple rows of input and output fibers that occupy multiple planes. In other words, the input and output fibers are not all arranged in the same plane as a common substrate. This allows an optical beam from an input fiber in one plane to be cross-connected or switched to an output fiber in a different plane. Thus, the 3D optical switch 100 provides an array of free-space optical connections between input and output fibers located in different planes. The use of input and output fibers in different planes allows for a potentially greater number of input and output fibers than a 2D optical switch, which results in greater capacity.

As will be discussed below, the optical switch 100 preferably uses 2D MEMS optical scanners. It has been found herein that 2D scanners are ideal for implementing 3D optical cross-connects, i.e., optical cross-connects where the input and output fibers are not arranged in the same plane as a common substrate. Furthermore, the input and output of the optical switch 100 are preferably symmetric, which makes the switch 100 convenient for bidirectional operation.

In accordance with the present invention, the optical switch 100 uses a modular scheme. Specifically, the optical switch 100 includes a first module 102 and a second module 104. Either one of the modules 102 or 104 may be referred to as a 3D optical switch module that, preferably, uses MEMS mirror scanners. In the illustrated embodiment the first and second modules 102, 104 are substantially identical, but it should be understood that there may be minor variations between the first and second modules 102, 104 in some embodiments of the invention.

In the illustrated embodiment, the first module 102 connects to an array of input fibers 110 and includes wavelength division multiplexers (WDM) 111, an input collimator array 112, a first mirror 114, a first scanner chip 116, and a first monitoring chip 118. Similarly, the second module 104 is connected to an array of output fibers 120 and includes wavelength division multiplexers 121, an output collimator array 122, a second mirror 124, a second scanner chip 126, and a second monitoring chip 128. As an optional feature, an array of monitoring beams 130 may be tapped into the array of input fibers 110 by tap couplers, and an array of monitoring beams 131 (discussed below) may be tapped into the array of output fibers 120 by tap couplers. It should be understood that the monitoring beams (also referred to herein as the "monitoring wavelength") may either be tapped into the input and output fibers 110, 120 as shown, or alternatively, beam splitters may be employed in the modules 102, 104 to receive the monitoring beams independently of the input and output fibers 110, 120. The use of such beam splitters will be discussed below.

The first mirror 114 is preferably positioned to receive light beams from the array of input fibers 110 via the input collimator array 112 (i.e., the input channels) and to reflect the light beams in a direction substantially normal to the array of input channels. By way of example, the first mirror 114 may be positioned at a 45° angle with respect to the input channels and have its reflective surface facing the input channels. Similarly, the second mirror 124 is preferably positioned to reflect light beams into the array of output fibers 120 via the output collimator array 122 (i.e., the output channels). In the illustrated embodiment the second mirror 124 receives the light beams from a direction substantially normal to the array of output channels. By way of example, the second mirror 124 may be positioned at a 45° angle with respect to the output channels and have its reflective surface facing the output channels. While 45° is an exemplary orientation for the first and second mirrors 114, 124, it should be well understood that a 45° orientation is not required and that the first and second mirrors 114, 124, as well as the first and second scanner chips 116, 126, may be oriented at many other angles in accordance with the present invention.

The first and second mirrors 114, 124 preferably comprise wavelength selective mirrors or dichroic mirrors. A wavelength selective mirror can be used to reflect signal wavelengths and transmit all or a portion of a monitoring wavelength. In other words, a wavelength selective mirror is partially transmissive for all or a portion of a certain wavelength of light. The certain wavelength of light can conveniently be used as a monitoring wavelength. It should be well understood that the percentage of transmissiveness and reflectiveness of the mirrors 114, 124 may vary greatly in accordance with the present invention. Preferably, the wavelength selective mirrors 114, 124 comprise layered dielectric mirrors that are partially transparent for the monitoring wavelength, but use of layered dielectric mirrors are not required. Because one function of a mirror is to redirect optical beams, the wavelength selective mirrors 114, 124 may also be referred to as wavelength selective optical redirecting devices.

The first scanner chip 116 provides the function of a director, i.e., it selects the output channel. The second scanner chip 126 provides the function of a redirector, i.e., it ensures coupling into the output fibers 120. Thus, the director and re-director are preferably scanner based. The distance between the first scanner chip 116 (director) and the second scanner chip 126 (redirector) and the loss budget determine the required scan angles. The scan angles will be discussed in more detail below.

Although the illustrated optical switch 100 comprises a 4×4 structure having sixteen inputs and sixteen outputs, it should be well understood that the specific number of inputs and outputs can vary greatly in accordance with the present invention. For example, 8×8, 64×64, and larger structures can all be made in accordance with the teachings of the present invention.

Figure 3A:
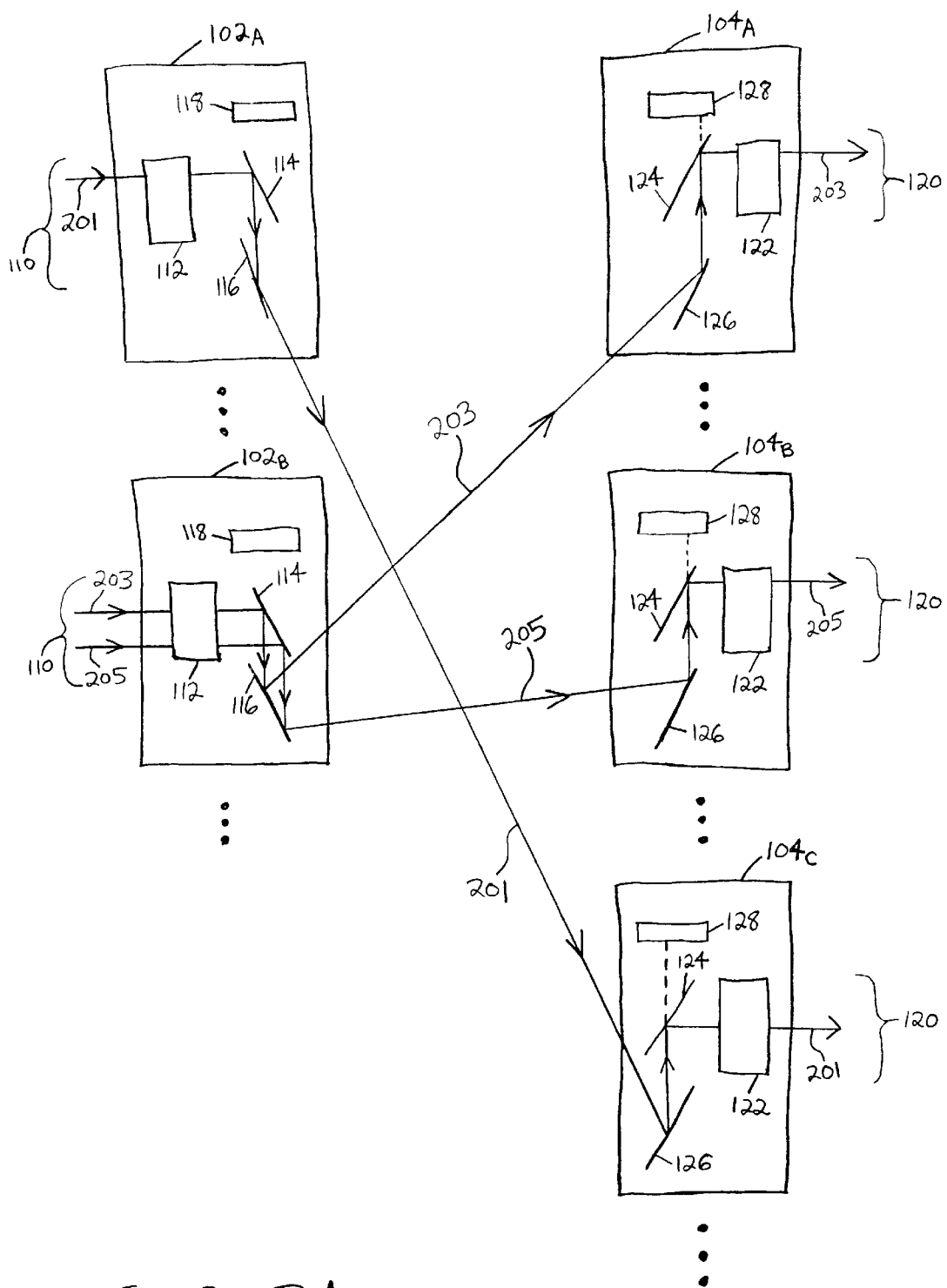
FIGS. 3A and 3B are schematic, side views illustrating optical switches that use multiple modules of the type shown in FIG. 1 in accordance with the present invention.
Figure 3B:
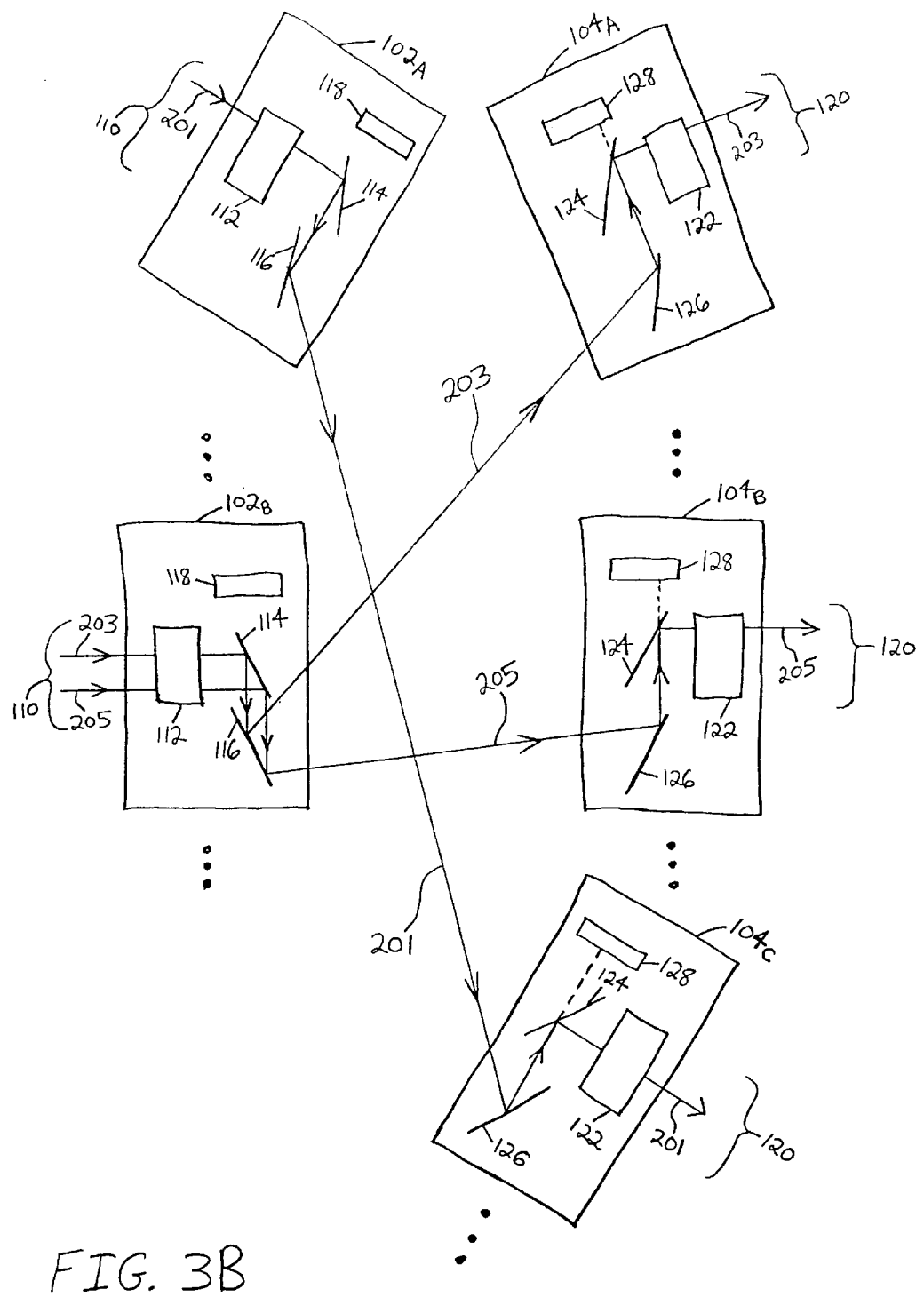

One advantage of the optical switch 100's modular scheme is that stand-alone optical switches can be made that are highly scalable. In other words, multiple modules can be used to accommodate large numbers of inputs and outputs. For example, FIGS. 3A and 3B illustrate exemplary versions of optical switches that are constructed using multiple numbers of the first and second modules 102, 104. Either more or fewer of the input modules 102, and either more or fewer of the output modules 104, may be used to accommodate the desired number of inputs and outputs, respectively. It should be understood that the total number of inputs does not have to be equal to the total number of outputs.

Another advantage of the modularity of the optical switches of the present invention is that the individual modules are hot swapable. In other words, any of the modules can be removed and changed while the switch is running. This feature makes configuring and maintaining the switch particularly easy.

Figure 4:
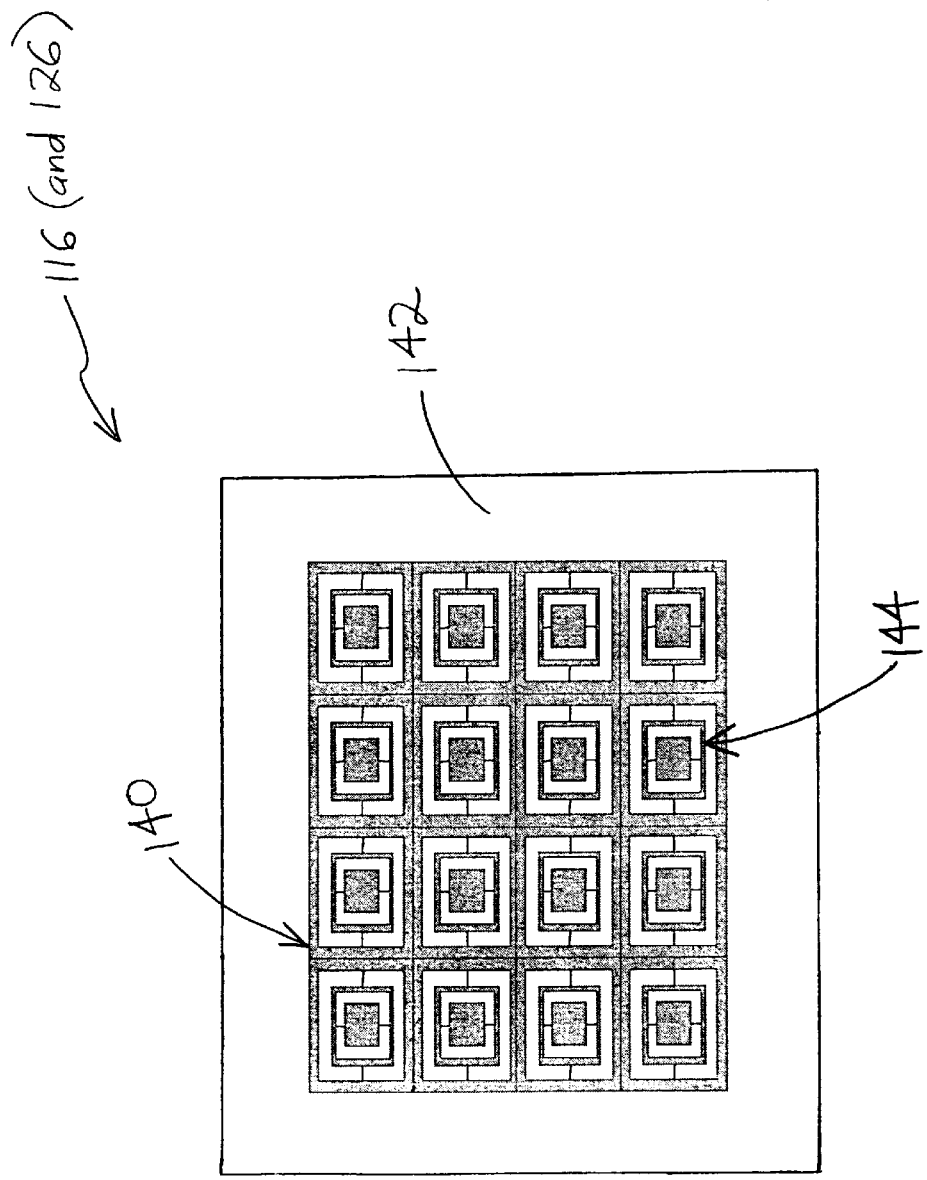
FIG. 4 is a top view illustrating one of the scanner chips shown in FIG. 1.

Referring to FIG. 4, there is illustrated the upper surface of an exemplary version of the first scanner chip 116. An identical or substantially similar chip is preferably employed as the second scanner chip 126. The first scanner chip 116 includes an array 140 of moveable micromirrors formed on a substrate 142. Because one function of a mirror is to redirect optical beams, the movable micromirrors may also be referred to as movable optical redirecting devices. Each of the movable micromirrors is part of an optomechanical switching cell. The mirror array 140 is preferably fabricated in accordance with Micro Electro Mechanical Systems (MEMS) technology. Furthermore, the mirror array 140 is preferably configured to operate as a two-dimensional (2D) optical scanner. 2D optical scanners with large rotation angles, narrow beam divergence, and high resonant frequency can be implemented with MEMS technology. MEMS technology is attractive for reducing the size, weight, and complexity of the optical scanners.

The mirror array 140 includes several MEMS mirror assemblies 144. In the illustrated embodiment, the mirror array 140 includes a 4×4 matrix of MEMS mirror assemblies 144. It should be well understood, however, that different size matrices of MEMS mirror assemblies 144 may be used in accordance with the present invention.

Figure 5:
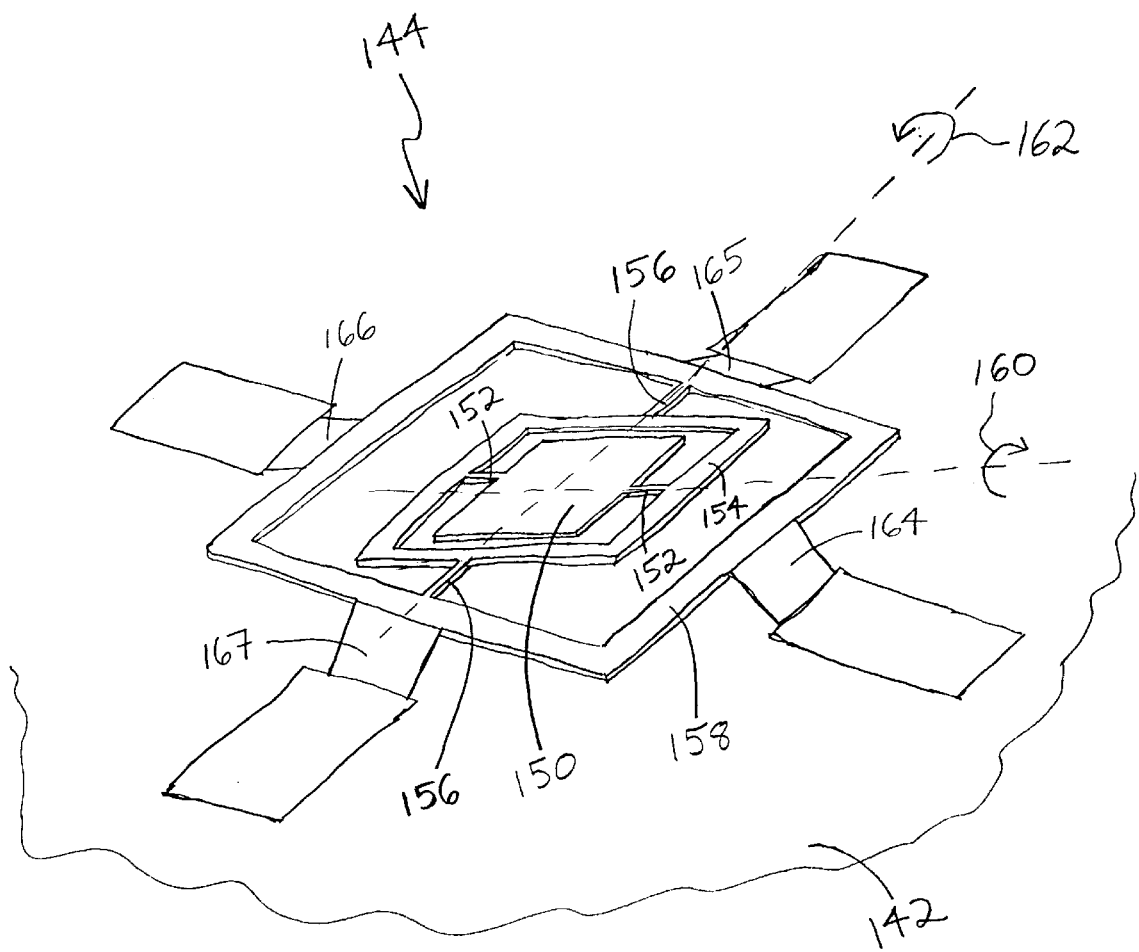
FIG. 5 is a perspective view illustrating one of the micromirror assemblies shown in FIG. 4.

FIG. 5 illustrates an exemplary version of one of the MEMS mirror assemblies 144. By way of example, this structure may be surface-micromachined and may be fabricated by the standard surface-micromachining process offered by the MEMS Technology Applications Center at Microelectronics Center at North Carolina (MCNC), Research Triangle Park, N.C., or using bulk silicon technology. Each of the MEMS mirror assemblies 144 includes a movable micromirror 150 that is substantially parallel to the plane of the substrate 142 when in a neutral position. Two support means 152 are connected between the micromirror 150 and a first mirror frame support 154. Two support means 156 are connected between the first mirror frame support 154 and a second mirror frame support 158. By way of example, the support means 152, 156 may comprise torsion bars, be part of a gimbal structure, or the like. Four side support plates 164, 165, 166, 167 support the second mirror frame support 158.

The movable micromirror 150 is preferably movable in two dimensions. Specifically, the position of the micromirror 150 can be adjusted in a direction indicated by arrow 160 by rotation around an axis through the support means 152. The position of the micromirror 150 can also be adjusted in a direction indicated by arrow 162 by rotation around an axis through the support means 156. Such two dimensional adjustability allows the movable micromirror 150 to selectively intercept and redirect beams reflected off of the mirror 114 from the array of input fibers 110.

Figure 6A:
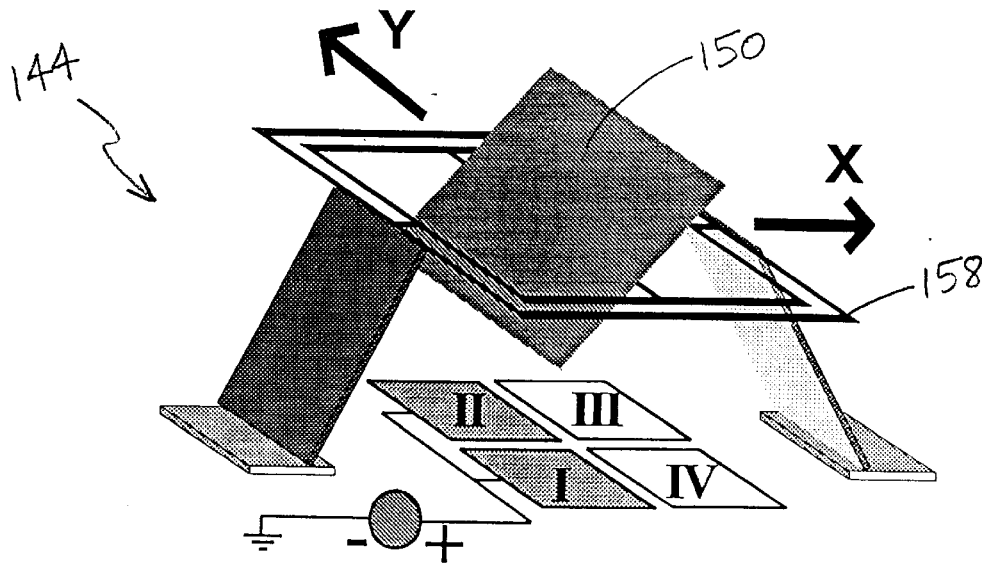
FIGS. 6A and 6B are perspective views illustrating the operation of the micromirror assembly shown in FIG. 5.
Figure 6B:
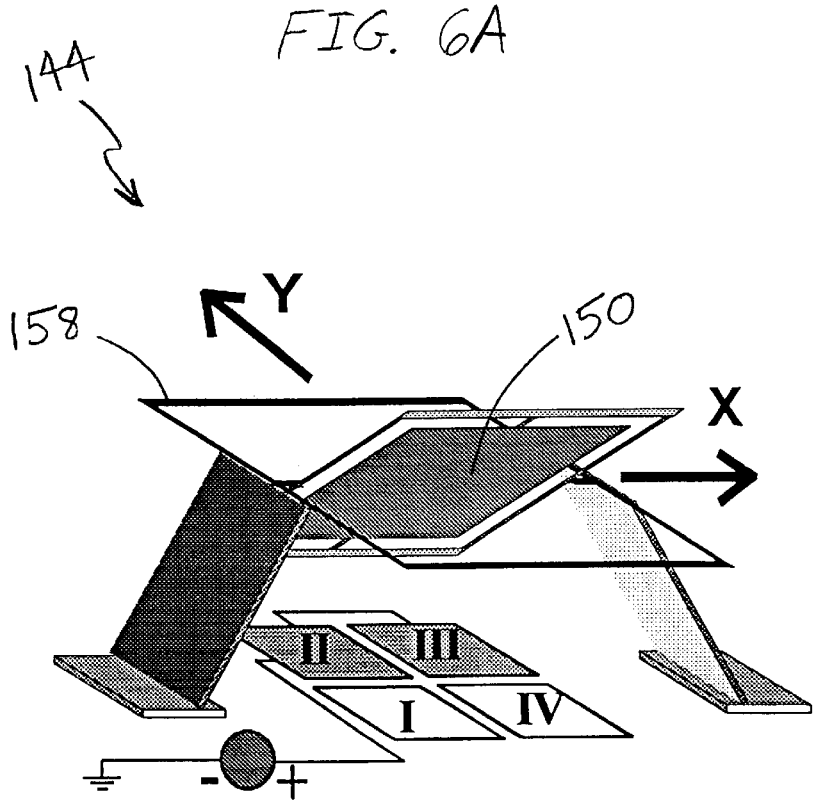

Referring to FIGS. 6A and 6B, there is illustrated an exemplary manner in which the angles of the micromirror 150 may be controlled. In order to simplify the illustration, only two side support plates are drawn. The micromirror 150, which is attached to the fixed frame 158 by support means 156, is suspended over four electrodes I, II, III, IV. By way of example, the mirror assembly 144 may be biased electrostatically by the quad-electrodes in the analog regime before snap-down. By applying voltage bias to electrode I and II, the mirror 150 is rotated around the Y-axis as shown in FIG. 6A (axis 160 in FIG. 5). The mirror 150 is rotated around the X-axis when applying electrical bias to electrode II and III as shown in FIG. 6B (axis 162 in FIG. 5). Thus, the mirror angles can be controlled by properly biasing the quad electrodes.

Because the angles of the movable micromirror 150 may be adjusted under electronic control, such electronic control may be provided by an electrical subsystem for the optical switch 100. Electrical switch and control signals are formatted and provided to a configuration control module. In response, this module adjusts the state of individual MEMS mirror assemblies 144. Such an electrical subsystem will provide electrical power to the optical subsystem after appropriately conditioning and converting electrical power received from an external source.

By way of example, the first and second scanner chips 116, 126 and the MEMS mirror assemblies 144 described above may be fabricated in accordance with the disclosure and teachings of U.S. patent application Ser. No. 09/680,907, filed of even date herewith, entitled "OPTICAL CROSS-CONNECT WITH SINGLE CHIP 2D SCANNER AND MONITORING SCHEME", by inventors Li Fan and Steffen Gloeckner, the entire contents of which are hereby expressly incorporated by reference into the present application as if fully set forth herein. Furthermore, the full disclosures of the following two papers are hereby expressly incorporated by reference into the present application as if fully set forth herein: (1) "Two-Dimensional Optical Scanner with Large Angular Rotation Realized by Self-Assembled Micro-Elevator," by L. Fan and M. C. Wu, *Proc. IEEE LEOS Summer Topical Meeting on Optical MEMS*, Paper WB4, Monterey, Calif. Aug. 20–22, 1998; and (2) "MEMS Technology for Optical Crosslinks for Micro/Nano Satellites," by W. Piyawattanametha, L. Fan, S. S. Lee, G. D. Su, and M. C. Wu, *International Conference on Integrated Nano/Microtechnology for Space Applications*, Houston, Tex., Nov. 1–6, 1998. It should be well understood, however, that other devices and techniques may be used for the first and second scanner chips 116, 126 and the MEMS mirror assemblies 144 in accordance with the present invention. In addition, the full disclosure of U.S. Pat. No. 5,867,297 is hereby expressly incorporated by reference into the present application as if fully set forth herein, and the entire contents of U.S. patent application Ser. No. 09/063,644, filed Apr. 20, 1998, entitled "Micromachined Optomechanical Switches", and United States Provisional Patent Application No. 60/136,438, filed May 28, 1999, entitled "Assembly and Packaging of Micromachined Optical Switches", are hereby expressly incorporated by reference into the present application as if fully set forth herein.

The first and second monitoring chips 118, 128 are capable of precisely monitoring beam position for fast control. The monitoring chips 118, 128 provide an ideal means for detecting beam position so that adjustments in the beam alignment can be made. In this way, the 3D optical switch 100 provides for monitor and control of the MEMS mirror arrays in the first and second scanner chips 116, 126. As will be described below, the signal loss associated with the monitor optics is minimized.

The first monitoring chip 118 is preferably positioned substantially parallel to the array of input channels of the input collimator array 112. As will be discussed below, the first monitoring chip 118 receives the portion of the monitoring wavelength that comes from the fiber array in the second module 104 and is reflected from the second mirror 124, the second scanner chip 126, the first scanner chip 116, and transmitted through the first mirror 114. In this way, the first monitoring chip 118 can detect the positions of the optical beams that are reflected off of the first and second scanner chips 116, 126. This data can be used to make adjustments to the positions of the movable micromirrors in the first and second scanner chips 116, 126 in order to better align the optical beams. Similarly, the second monitoring chip 128 is positioned substantially parallel to the array of output channels of the output collimator array 122 and receives the portion of the monitoring wavelength that comes from the fiber array in the first module 102 and is reflected from the first mirror 114, the first scanner chip 116, the second scanner chip 126, and transmitted through the second mirror 124. In this way, the second monitoring chip 128 can detect the positions of the optical beams that are reflected off of the first and second scanner chips 116, 126. This data can be used to make adjustments to the positions of the movable micromirrors in the first and second scanner chips 116, 126 in order to better align the optical beams.

Referring to FIG. 7, the first monitoring chip 118 preferably includes a detector array 170. The first monitoring chip 118 is positioned so that the detector array 170 faces the mirror 114. The detector array 170 can precisely detect the beam position and provide fast feedback control. Preferably, an identical or substantially similar chip is employed as the second monitoring chip 128.

The detector array 170 preferably includes one detector for each optical beam. Thus, for the illustrated example where there are sixteen input fibers 110, sixteen output fibers 120, and sixteen moveable micromirrors in each of the scanner chips 116, 126, the detector array 170 includes sixteen corresponding detectors. For a system having sixty-four input and output fibers, the detector array 170 would preferably include sixty-four corresponding detectors, and so on.

One exemplary type of detector array that may be used for the detector array 170 is a 2D quadrant detector array. With this type of detector array, each detector includes four quadrants for detecting the position of the optical beam. For example, quadrants 172, 174, 176, 178 comprise one detector. By using four quadrants in each detector, the detector array can provide beam spot position data for the corresponding scanning mirrors. Because each of the quadrants 172, 174, 176, 178 covers a relatively large area compared to a beam spot, the detector array 170 provides an ideal means for detecting beam position, even when the beams are badly out of alignment. As such, the detector array 170 is ideal for use in making both fine and coarse adjustments in the beam alignment.

Referring again to FIGS. 1 and 2, light beams from the first array of input fibers 110 that exit from the input collimator array 112 are reflected by the first mirror 114 and subsequently routed by the first scanner chip 116. The signals exiting from the first module 102 enter the second module 104 where they are reflected by the second scanner chip 126 to the direction normal to the output fiber array 120. The second mirror 124 couples the signals into the output collimator array 122 and the output fibers 120.

In order to perform an optical cross-connect or optical switching function, light beams from selected ones of the movable micromirrors in the first scanner chip 116 are directed to selected ones of the movable micromirrors in the second scanner chip 126. In other words, the angles of a specific movable micromirror in the first scanner chip 116 are adjusted to direct its received light beam to a specific movable micromirror in the second scanner chip 126. The specific movable micromirror in the first scanner chip 116 will be in a different row and/or column than the specific movable micromirror in the second scanner chip 126 if a switching function is to be performed. The angles of the specific movable micromirror in the second scanner chip 126 are adjusted to ensure that the light beam is properly reflected off of the second mirror 124 into the desired channel of the output collimator array 122 and output fibers 120.

For example, in order to illustrate the switching operation of the optical switch 100, it will be assumed that the input channel (or fiber) 180 is to be cross-connected with the output channel (or fiber) 182. In other words, the second fiber (180) in the top row of the array of input fibers 110 is to be switched to the first fiber (182) in the bottom row of the array of output fibers 120.

A light beam 200 from the input channel 180 is directed towards the first mirror 114 where it is reflected and directed to the corresponding movable micromirror 184 in the top row of the first scanner chip 116. The angles of the movable micromirror 184 are adjusted to direct the beam 200 towards the moveable micromirror 186 in the bottom row of the second scanner chip 126. The moveable micromirror 186 corresponds to the output channel 182. The angles of the movable micromirror 186 are adjusted so that the beam 200 reflects off of the second mirror 124 and is properly aligned with the output channel 182. In this way the light beam 200 from the input channel 180 of input fibers 110 is switched, or cross-connected, to a desired optical through channel 182 of the output fibers 120.

Referring again to FIG. 3A, multiple numbers of the first and second modules 102, 104 may be combined to form an optical switch having many inputs and outputs. In this scenario, optical switching operations may be performed between first and second modules 102, 104 in the same row and/or different rows. For example, the light beam 205 is switched from a channel in the first module $102_B$ to a channel in the second module $104_B$. This switching operation is similar to the switching operation described above in that the first module $102_B$ and the second module $104_B$ are in the same row. As another example, the light beam 203 is switched from a channel in the first module $102_B$ to a channel in the second module $104_A$. This switching operation is performed between modules that are in different rows. Similarly, the light beam 201 is switched from a channel in the first module $102_A$ to a channel in the second module $102_C$. It should be well understood that the optical switching and beam alignment techniques described herein can be applied to modules that are in the same and/or different rows. Again, one important advantage of the modularity of the optical switches of the present invention is that the individual modules are hot swapable, meaning that the modules can be removed and changed while the switch is running.

Several of the mirrors 114, 124 and scanner chips 116, 126 shown in FIG. 3A are oriented at greater than a 45° angle. Such an orientation facilitates switching operations between modules that are in different rows. The larger angles allow the light beams to be directed at greater angles, e.g., the light beam 201 from the first module $102_A$ down to the second module $102_C$. FIG. 3B illustrates an alternative configuration for a modular optical switch made in accordance with an embodiment of the present invention. In this configuration several of the modules themselves are angled, which allows light beams to more easily be directed to modules that are in different rows. This allows more flexibility in the angles of the mirrors 114, 124 and scanner chips 116, 126. While modules $102_A$, $104_A$ and $102_C$ are shown to be angled, it should be understood that any of the modules may be angled in accordance with the present invention.

For optimal performance the movable micromirrors that the light beam 200 hits should be adjusted so that the data path is precisely aligned. In other words, the movable micromirrors are preferably adjusted so that the light beam 200 is properly aligned with the output fiber 182. Even a few millidegrees of misalignment can significantly reduce signal strength. Monitoring beams may be used to detect alignment or misalignment of data paths (or channels) in the optical switch 100. In accordance with the present invention, one exemplary way to perform this detection is to simultaneously inject monitor beams into the same data path from both sides (i.e., input and output) of the switch 100. The position of one of the monitoring beams is detected with the first monitoring chip 118, and the position of the other monitoring beam is detected with the second monitoring chip 128. This position data can be used to adjust the movable micromirrors in order to properly align the data channel.

It was mentioned above that an array of input monitoring beams 130 may be tapped into the array of input fibers 110. Such monitoring beams (or monitoring wavelengths) may be used to assist in aligning the optical beams. In this scenario (i.e., where monitoring wavelengths are tapped into the array of input fibers 110), each of the optical beams exiting the input collimator array 112 includes both a monitoring beam component and a data signal component. The wavelength difference between the monitoring beam component and the data signal component is preferably large enough so that they can be distinguished by the first and second wavelength selective mirrors 114, 124.

Using the light beam 200 as an example, after the beam 200 is redirected by the scanner chip 126, the data signal component of the beam 200 is reflected off of the mirror 124 and into the desired output channel in the collimator array 122. Either all or a portion of the monitoring beam component 202 of the beam 200 is transmitted through the mirror 124 and is incident upon the second monitoring chip 128. The precise percentage of the monitoring beam component 202 of the beam 200 that is transmitted through the mirror 124 depends on the percentage of transmissiveness of the wavelength selective second mirror 124. The second monitoring chip 128 senses the position of the transmitted monitoring beam component 202 as directed by the second scanner chip 126. This sensed position data, along with position data sensed by the first monitoring chip 118 (described below), can be fed back to control the angles of the moveable micromirrors in the first and second scanner chips 116, 126 used to direct the beam 200.

Figure 8:
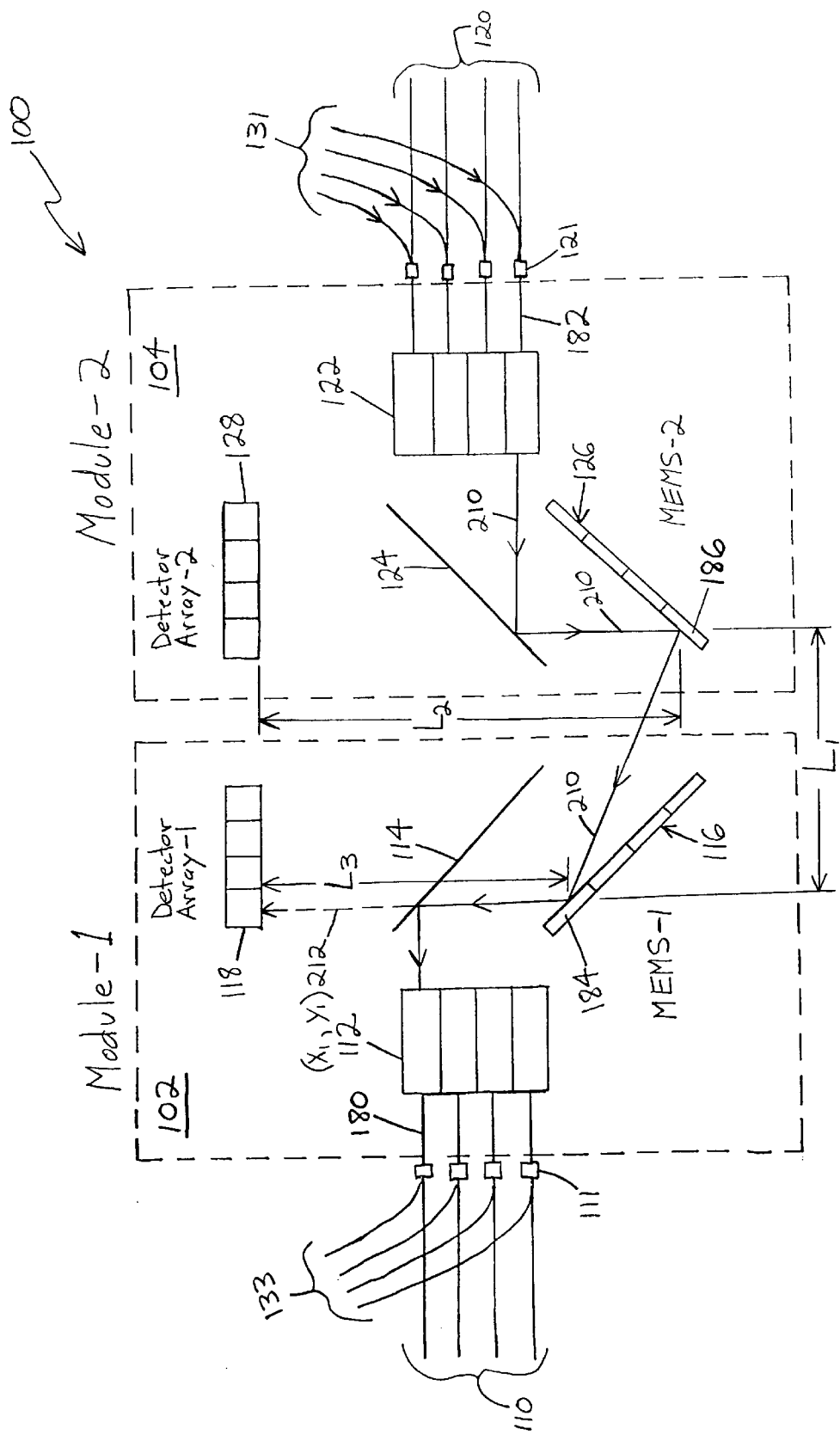
FIG. 8 is a schematic, side view further illustrating the operation of the modular optical switch shown in FIG. 1.

Referring to FIG. 8, in order to obtain enough data to fully control the angles of the moveable micromirrors in the first and second scanner chips 116, 126, a light beam 210 is directed through the optical switch 100 in the reverse direction, i.e., from the output fibers 120 to the input fibers 110. In this scenario, for example, an array of input monitoring beams 131 may be tapped into the array of output fibers 120, and an array of output monitoring beams 133 may be tapped from the array of input fibers 110.

Specifically, the light beam 210 from the output fiber 182 is directed through the optical switch 100 (in the reverse direction) to the input fiber 180 along the same path used by the light beam 200. The same path is used so that the light beam 210 reflects off of the same movable micromirrors 186, 184 as the light beam 200. The light beam 210 includes both a monitoring beam component and a data signal component. After the beam 210 is redirected by the first scanner chip 116, the data signal component of the beam 210 is reflected off of the first mirror 114 and into the channel of the input collimator array 112 corresponding to the input fiber 180. Either all or a portion of the monitoring beam component 212 of the beam 210 is transmitted through the first mirror 114 and is incident upon the first monitoring chip 118. Again, the precise percentage of the monitoring beam component 212 of the beam 210 that is transmitted through the first mirror 114 depends on the percentage of transmissiveness of the wavelength selective first mirror 114. The first monitoring chip 118 senses the position of the transmitted monitoring beam component 212 as directed by the first scanner chip 116. This sensed position data, along with the position data sensed by the second monitoring chip 128, can be fed back to control the angles of the moveable micromirrors in the first and second scanner chips 116, 126 used to direct the beam 210.

Therefore, position data can be obtained for use in adjusting the angles of the moveable micromirrors in the first and second scanner chips 116, 126 by sending light beams through the optical switch 100 in both the forward and reverse directions along the same path. By detecting the position of the monitoring beam component 202 with the monitoring chip 128, and the monitoring beam component 212 with the monitoring chip 118, adjustments can be made to the positions of the corresponding mirrors in the first and second scanner chips 116, 126 in order to better align the optical beam 200.

More specifically, in order to align a single data signal path, such as the path traveled by light beam 200 from input fiber 180 to output fiber 182, monitor beams from both sides (130 and 131) are injected into the channel simultaneously.

The position of the monitoring beam component 202 detected at the second monitoring chip 128 provides information regarding the combination of angles from the mirror 184 and the mirror 186. The position of the monitoring beam component 212 is also needed in order to precisely measure each of the individual mirror angles. In other words, the data from both the first and second monitoring chips 118, 128 is preferably used to adjust each micromirror. Similarly, the position of the monitoring beam component 212 detected at the first monitoring chip 118 provides information regarding the combination of angles from the mirror 184 and the mirror 186. The position of the monitoring beam component 202 is also needed in order to precisely measure each of the individual mirror angles. Again, the data from both the first and second monitoring chips 118, 128 is preferably used to adjust each micromirror. By measuring the beam position at the first and second monitoring chips 118, 128 with the monitoring beam components 212, 202 simultaneously, a unique solution of the measurement of the angles of the mirror 184 and the mirror 186 can be found.

For this scenario, i.e., where light beams are sent through the optical switch 100 in both the forward and reverse directions along the same path, the angular deviations of the subject micromirror in the first scanner chip 116 ($\theta_{x1}$, $\theta_{y1}$) and the subject micromirror in the second scanner chip 126 ($\theta_{x2}$, $\theta_{y2}$) from their desired angles are measured as the function of position deviations detected at the subject detectors in both the first monitoring chip 118 ($x_1$, $y_1$) and the second monitoring chip 128 ($x_2$, $y_2$). Thus, in the illustrated example, ($\theta_{x1}$, $\theta_{y1}$) and ($\theta_{x2}$, $\theta_{y2}$) are the angular deviations from the desired mirror angles of the mirrors 184, 186, respectively. ($x_1$, $y_1$) and ($x_2$, $y_2$) are the position deviations of the monitoring beams 212, 202, respectively, from their desired positions. The angular deviations for the illustrated example are given by the following equations:

$$\theta_{x1} = \frac{1}{2A_1}(x_2 - B_1 x_1) \tag{1}$$

$$\theta_{y1} = \frac{1}{2A_1}(y_2 - B_1 y_1) \tag{2}$$

$$\theta_{x2} = \frac{1}{2A_2}(-B_2 x_2 + x_1) \tag{3}$$

$$\theta_{y2} = \frac{1}{2A_2}(-B_2 y_2 + y_1) \tag{4}$$

where, $$A_1 = \frac{L_1(L_1 + L_2 + L_3)}{L_1 + L_3} \tag{5}$$

$$B_1 = \frac{L_2}{L_1 + L_3} \tag{6}$$

$$A_2 = \frac{L_1(L_1 + L_2 + L_3)}{L_1 + L_2} \tag{7}$$

$$B_2 = \frac{L_3}{L_1 + L_2} \tag{8}$$

and $L_1$ is the distance between the mirror 184 and the mirror 186, $L_2$ is the distance between the mirror 186 and the subject detector in the second monitoring chip 128, and $L_3$ is the distance between the mirror 184 and the subject detector in the first monitoring chip 118. By using the above equations a closed-loop control of the arrays of movable micromirrors can be achieved.

Figure 9:
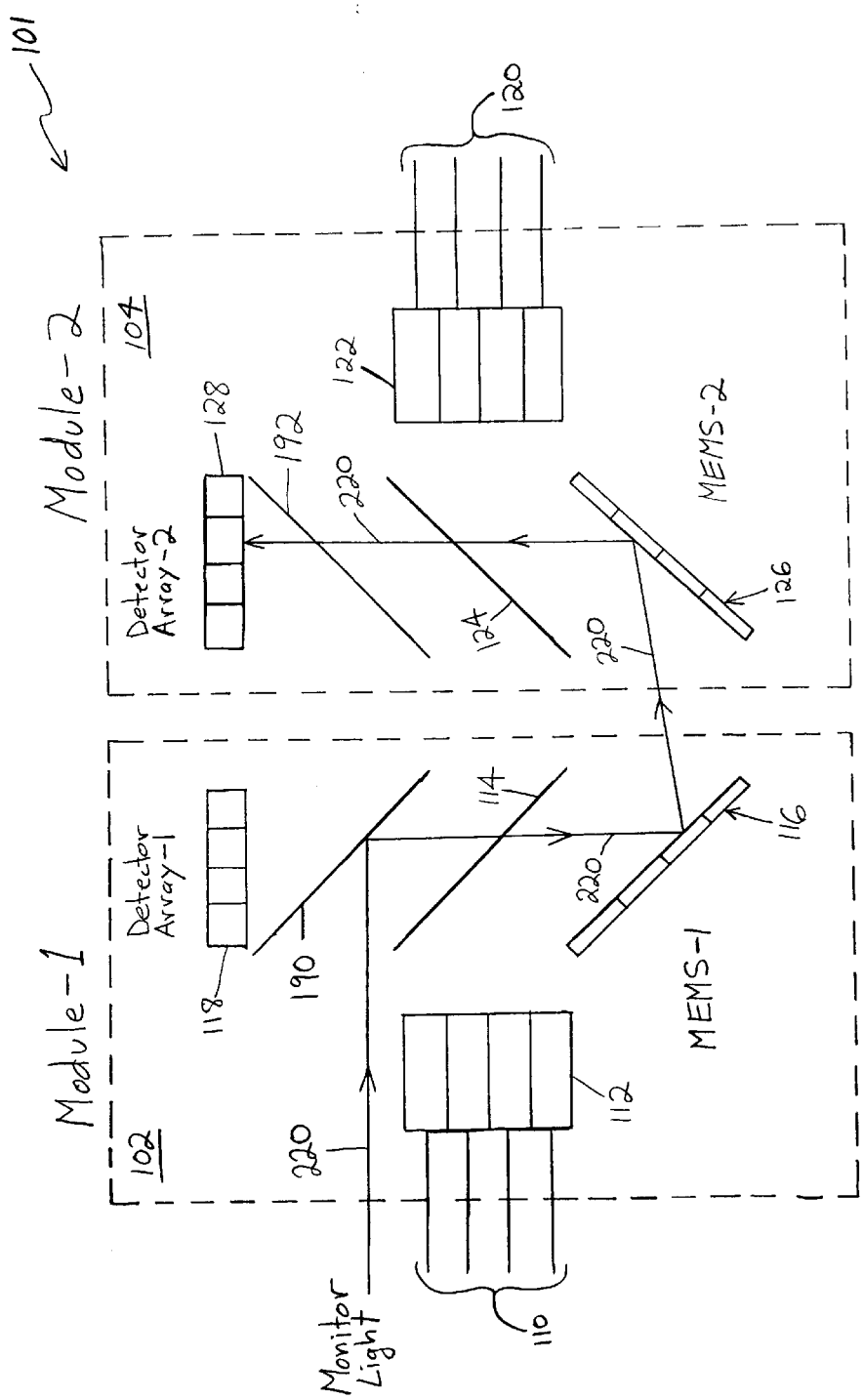
FIGS. 9 and 10 are schematic, side views illustrating an alternative modular optical switch made in accordance with the present invention.

As mentioned above, beam splitters may be employed in the first and second modules 102, 104 to receive the monitoring beams independently of the input and output fibers 110, 120. FIG. 9 illustrates one exemplary way in which beam splitters can be incorporated into a modular optical switch 101 made in accordance with the present invention. Specifically, a first beam splitter 190 is included in the first module 102 and is positioned substantially parallel to the first mirror 114. A second beam splitter 192 is included in the second module 104 and is positioned substantially parallel to the second mirror 124. The first and second beam splitters 190, 192 preferably comprise 50/50 beam splitters, meaning that 50% of the incident light beam is transmitted and 50% of the incident light beam is reflected. By way of example, the first and second beam splitters 190, 192 may each comprise a dichroic mirror.

A monitor light beam, such as the monitor light beam 220, is introduced to the first module 102 via the first beam splitter 190. 50% of the monitor light beam 220 is reflected off of the first beam splitter 190 and is directed through the first mirror 114 to the first scanner chip 116. The monitor light beam 220 is directed by the first scanner chip 116 to the second scanner chip 126, where it is redirected through the second mirror 124, through the second beam splitter 192, and to the second monitoring chip 128. The second beam splitter 192 transmits 50% of the remaining portion of the monitor light beam 220, resulting in a total of 25% of the original monitor light beam 220 being incident on the second monitoring chip 128. Similar to as described above, the corresponding detector in the second monitoring chip 128 senses the position of the monitor light beam 220.

Figure 10:
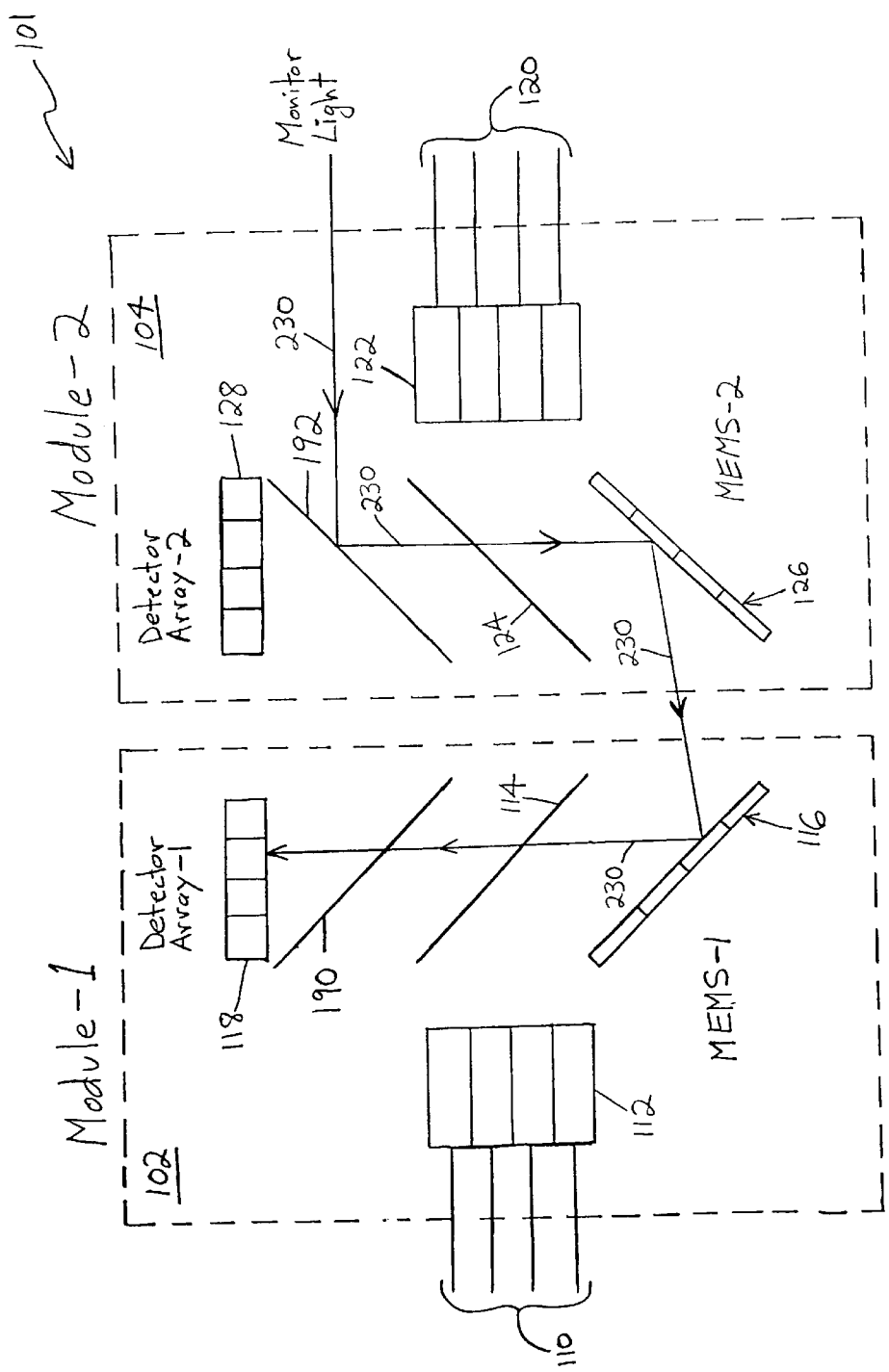

Referring to FIG. 10, a monitor light beam 230 is directed through the optical switch 101 along the same path in the reverse direction. Similar to the monitor light beam 220, 25% of the original monitor light beam 230 is incident on the first monitoring chip 118. The corresponding detector in the first monitoring chip 118 senses the position of the monitor light beam 230. The sensed position data from both monitor light beams 220, 230 can be fed back and used in the above equations to control the angles of the subject moveable micromirrors in the first and second scanner chips 116, 126.

The same equations described above apply to the scenario where the beam splitters 190, 192 are employed. In other words, the angular deviations of the subject micromirrors in the first and second scanner chips 116, 126 from their desired angles can be calculated using the equations described above.

An advantage of using the beam splitters 190, 192 is that they allow for the use of a monitoring beam having a substantially different wavelength than the data beam. Specifically, in the tapping scenario shown in FIG. 2 the monitor beam wavelength normally needs to be mode matched to the fiber mode. Such mode matching is not required when using the beam splitters 190, 192 because the monitoring beam is not tapped into the input fiber. Because mode matching to the fiber is not an issue when using a beam splitter, any wavelength can be used for the monitoring beam. Another advantage of using the beam splitters 190, 192 is that they help to minimize the signal loss associated with the monitor optics. Specifically, tapping the monitor beam into the data beam causes signal loss. The use of beam splitters eliminates the need for tapping, which avoids the signal loss involved with tapping.

Figure 11:
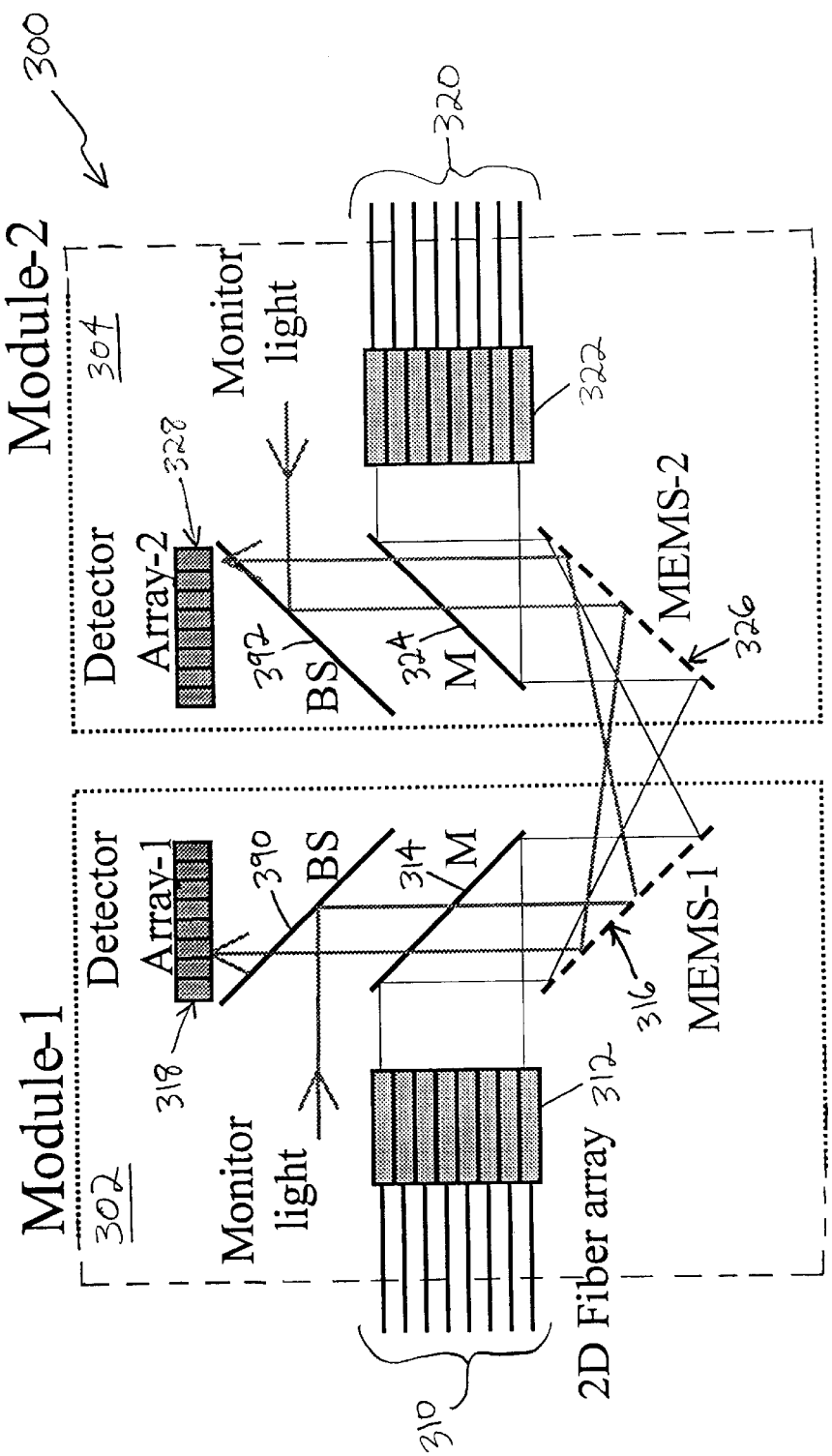
FIG. 11 is a schematic, side view illustrating another alternative modular optical switch made in accordance with the present invention.

It was mentioned above that the specific number of inputs and outputs of an optical switch of the present invention can vary greatly. Referring to FIG. 11, there is illustrated another optical switch 300 made in accordance with an embodiment of the present invention. The optical switch 300 is also modular, including a first module 302 and a second module 304. The optical switch 300 comprises an 8×8 structure having sixty-four inputs and sixty-four outputs.

Specifically, the first module 302 connects to an array of sixty-four input fibers 310 and includes an input collimator array 312, a first mirror 314, a first scanner chip 316, and a first monitoring chip 318. Similarly, the second module 304 is connected to an array of sixty-four output fibers 320 and includes an output collimator array 322, a second mirror 324, a second scanner chip 326, and a second monitoring chip 328. The first and second mirrors 314, 324 preferably comprise wavelength selective mirrors as described above.

The first and second scanner chips 316, 326 may be constructed similar to the first and second scanner chips 116, 126 described above, except that an 8×8 array of moveable micromirrors, or sixty-four moveable micromirrors, are included on each of the first and second scanner chips 316, 326. Similarly, the first and second monitoring chips 318, 328 may be constructed similar to the first and second monitoring chips 118, 128 described above, except that an 8×8 array of detectors, or sixty-four detectors, are included on each of the first and second monitoring chips 318, 328.

The illustrated embodiment of the optical switch 300 includes first and second beam splitters 390, 392, which function as described above. It should be understood, however, that the inclusion of the first and second beam splitters 390, 392 is optional. Alternatively, the monitoring beams may be tapped into and from the array of input fibers 310 and the array of output fibers 320 as described above.

Figure 12:
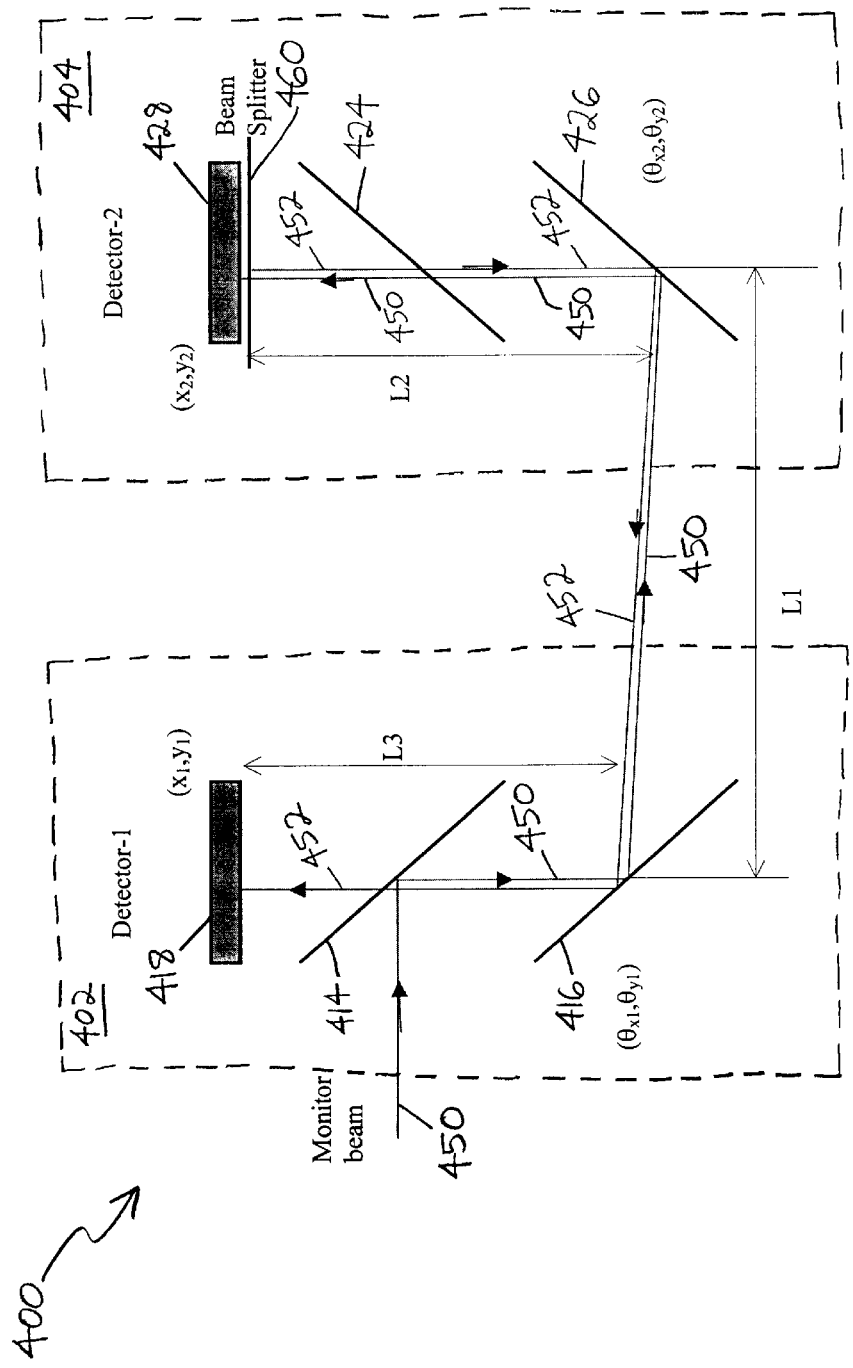
FIG. 12 is a schematic, side view illustrating another alternative modular optical switch made in accordance with the present invention.

As discussed above, alignment of a data path in the optical switches 100, 300 may be detected by simultaneously injecting monitor beams into the data path from both sides (i.e., input and output) of the switch. Referring to FIG. 12, there is illustrated another optical switch 400 made in accordance with an embodiment of the present invention. One advantage of the optical switch 400 is that alignment of a data path may be detected by injecting a monitor beam into only one side of the switch 400. A monitor beam still travels through the data path in both directions, but the monitor beam is injected into the switch on only one side.

Like the switches 100, 300, the optical switch 400 is also modular, including a first module 402 and a second module 404. The first module 402 includes a first mirror 414, a first scanner chip 416, and a first monitoring chip 418. Similarly, the second module 404 includes a second mirror 424, a second scanner chip 426, and a second monitoring chip 428. The first and second mirrors 414, 424 preferably comprise wavelength selective mirrors as described above. The first and second scanner chips 416, 426 may be constructed similar to the scanner chips described above, including any number of moveable micromirrors, e.g., 4×4, 8×8, etc., array of moveable micromirrors. Similarly, the first and second monitoring chips 418, 428 may be constructed similar to the monitoring chips described above. Input and output fibers and input and output collimator arrays are preferably included but have been omitted from the figure in order to simplify the description.

The monitor beam 450 may be directed into the optical switch 400 by using either of the techniques described above. In other words, the monitor beam 450 may be tapped into the input and output fibers, or beam splitters may be used.

Unlike the optical switches 100, 300 described above, the optical switch 400 preferably includes a beam splitter 460 positioned next to and in front of the second monitoring chip 428. The beam splitter 460 is preferably positioned just in front of and substantially parallel to the second monitoring chip 428.

During operation the monitor beam 450 initially travels through the switch 400 in a manner similar to the switch 100 described above. Namely, the monitor beam 450 is reflected off of the first wavelength selective mirror 414, a moveable micromirror in the first scanner chip 416, and a moveable micromirror in the second scanner chip 426. The angular deviations from the desired mirror angles of the subject moveable micromirrors in the first and second scanner chips 416, 426 are indicated by $(\theta_{x1}, \theta_{y1})$, $(\theta_{x2}, \theta_{y2})$, respectively.

After reflection from the moveable micromirror in the second scanner chip 426, the monitor beam 450 is at least partially transmitted through the second wavelength selective mirror 424. Following that, the monitor beam 450 is at least partially transmitted through the beam splitter 460. The position of the monitor beam 450 is then detected by the second monitoring chip 428. The position deviation of the monitoring beam 450 from the desired position is indicated by $(x_2, y_2)$.

In accordance with the present invention, the beam splitter 460 located in front of the second monitoring chip 428 partially reflects the monitor beam 450 back over the same path. The partially reflected back monitor beam is designated monitor beam 452 in the figure. The monitor beam 452 reflected by the beam splitter 460 travels the same path as the monitor beam 450, but in the reverse direction. The open loop repeatability will normally be sufficient such that the monitor beam 452 hits the same mirrors as the monitor beam 450. Specifically, the monitor beam 452 is reflected by the same two moveable micromirrors in the second and first scanner chips 426, 416. The monitor beam 452 is then at least partially transmitted through the first wavelength selective mirror 414 and reaches the first monitoring chip 418. The first monitoring chip 418 detects the position of the monitor beam 452. The position deviation of the monitor beam 452 from the desired position is indicated by $(x_1, y_1)$.

By measuring the position of the monitor beam 452 at the first monitoring chip 418 (detector-1), and by measuring the position of the monitor beam 450 at the second monitoring chip 428 (detector-2), a unique solution of the measurement of the angles for both of the moveable micromirrors in the first and second scanner chips 416, 426 can be found through the following derivations:

$$x_2 = 2\theta_{x1}(L_1+L_2) + 2\theta_{x2}L_2 \quad (9)$$

$$x_1 = x_2 + 2(\theta_{x1}+\theta_{x2})(L_1+L_2+L_3) + 2\theta_{x2}(L_1+L_3) + 2\theta_{x1}L_3 \quad (10)$$

Again, $(x_1, y_1)$ and $(x_2, y_2)$ are the position deviations of the monitor beams 452, 450 from the desired positions, and $(\theta_{x1}, \theta_{y1})$ and $(\theta_{x2}, \theta_{y2})$ are the angular deviations from the desired angles of the moveable micromirrors in the scanner chips 416, 426. The measurement of the angles is obtained by solving equations (9) and (10), resulting in the following equations:

$$\theta_{x1} = -\frac{L_2}{4(L_1+L_2+L_3)}x_1 + \frac{1}{2L_1}x_2 \quad (11)$$

$$\theta_{x2} = \frac{L_1+L_2}{4(L_1+L_2+L_3)}x_1 + \frac{1}{2L_2}x_2 \quad (12)$$

The derivations for $\theta_{y1}$ and $\theta_{y2}$ are similar.

The optical switch 400 allows for a monitor beam to be directed along the same data path in both directions by injecting the monitor beam into the switch on only one side. The partially reflected back monitor beam 452 is akin to the monitor beams 212, 230 described above that are directed through the optical switches 100, 101, respectively, in the reverse direction. Therefore, the beam splitter 460 in the optical switch 400 provides another way to direct a second monitor beam through the same data path in the reverse direction.

Figure 13:
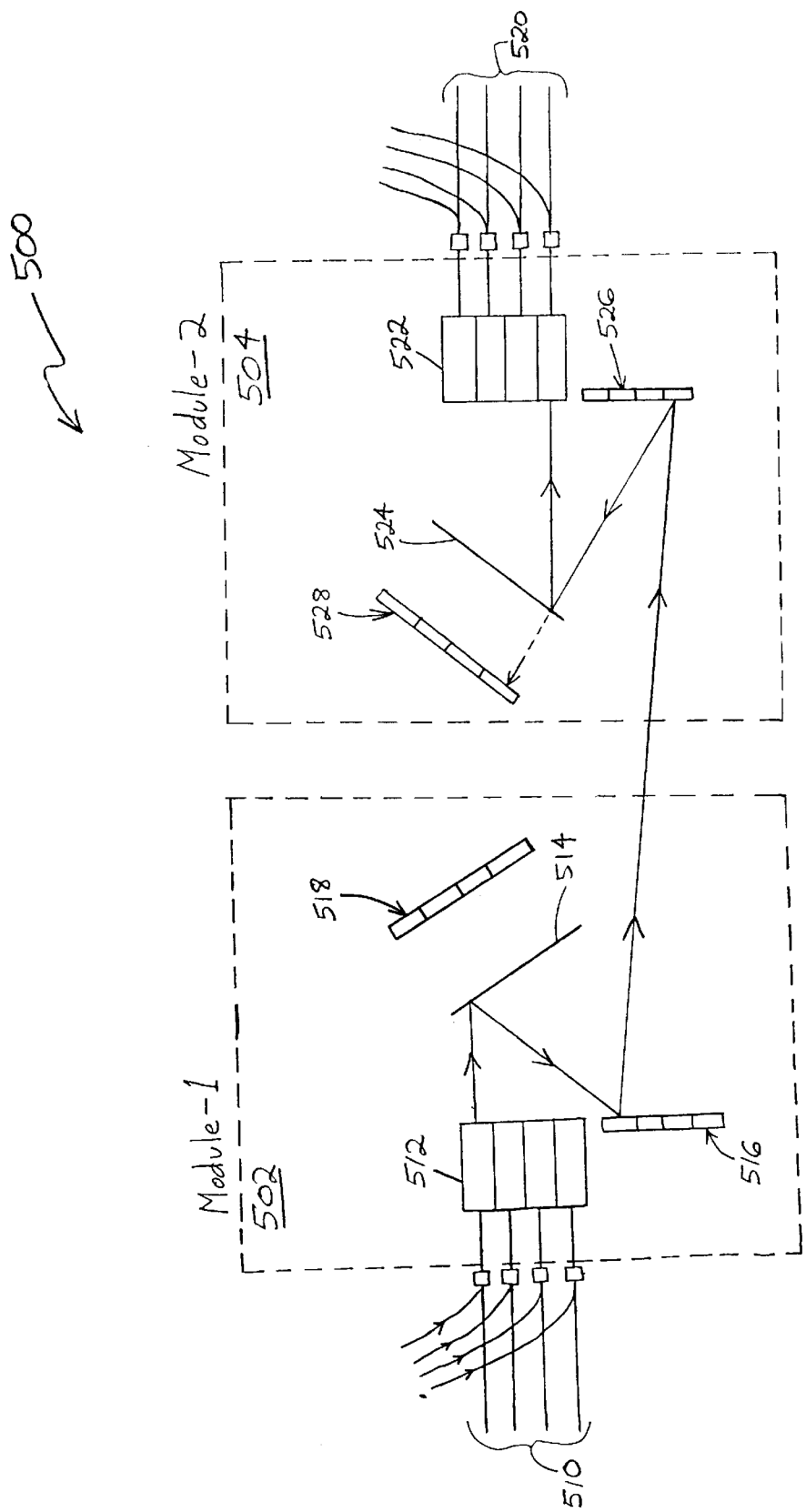
FIG. 13 is a schematic, side view illustrating another alternative modular optical switch made in accordance with the present invention.

It was mentioned above that the first and second scanner chips 116, 126 are not required to be oriented at 45° angles and that they may be oriented at many other angles in accordance with the present invention. Referring to FIG. 13, there is illustrated another optical switch 500 made in accordance with an embodiment of the present invention. The optical switch 500 is also modular, including a first module 502 and a second module 504. The first module 502 connects to an array of input fibers 510 and includes an input collimator array 512, a first mirror 514, a first scanner chip 516, and a first monitoring chip 518. Similarly, the second module 504 is connected to an array of output fibers 520 and includes an output collimator array 522, a second mirror 524, a second scanner chip 526, and a second monitoring chip 528. The first and second mirrors 514, 524 preferably comprise wavelength selective mirrors as described above.

The optical switch 500 illustrates an alternative orientation for the scanner chips and monitoring chips. Specifically, the first and second scanner chips 516, 526 are not positioned at 45° angles. Furthermore, the first and second monitoring chips 518, 528 are not positioned parallel to the input and output fibers. Thus, the components of the modules may be oriented in many different ways in accordance with the present invention.

Thus, embodiments of the present invention provide for modular, stand-alone 3D optical cross-connects that are scalable ($^{31}$ 64×64 or larger) with multiple modules. Such switches provide monitor and control of the MEMS mirror arrays, and the signal loss associated with monitor optics is minimized.

While the invention herein disclosed has been described by the specific embodiments and applications thereof, numerous modifications and variations could be made thereto by those skilled in the art without departing from the scope of the invention set forth in the claims.

What is claimed is:

1. A method of detecting alignment of an optical path through an optical switch, comprising the steps of:

directing a first monitor beam in a forward direction along at least a portion of the optical path, the at least a portion of the optical path including reflection off of a first moveable optical redirecting device and a second moveable optical redirecting device;

detecting a position of the first monitor beam that is reflected off of the second moveable optical redirecting device;

directing a second monitor beam in a reverse direction along the at least a portion of the optical path; and detecting a position of the second monitor beam that is reflected off of the first moveable optical redirecting device.

2. A method in accordance with claim 1, further comprising the step of:

determining a magnitude of at least one angle associated with at least one of the first and second moveable optical redirecting devices based on the detected positions of the first and second monitor beams.

3. A method in accordance with claim 2, wherein the determination of the magnitude of at least one angle is further based on a first distance between the first and second moveable optical redirecting devices, a second distance between the second moveable optical redirecting device and a detector for detecting the position of the first monitor beam, and a third distance between the first moveable optical redirecting device and a detector for detecting the position of the second monitor beam.

4. A method in accordance with claim 1, wherein each of the first and second moveable optical redirecting devices comprises a moveable optical redirecting device that is moveable in two dimensions.

5. A method in accordance with claim 1, wherein each step of detecting further comprises the step of:
detecting a position with a planar array of detectors.

6. A method in accordance with claim 1, further comprising the step of:
transmitting at least a portion of the first monitor beam that is reflected off of the second moveable optical redirecting device through a first wavelength selective optical redirecting device.

7. A method in accordance with claim 6, further comprising the step of:
transmitting at least a portion of the second monitor beam that is reflected off of the first moveable optical redirecting device through a second wavelength selective optical redirecting device.

8. A method in accordance with claim 1, wherein the optical path comprises:
a path followed by a light beam as it exits an optical input channel, reflects off of a first wavelength selective optical redirecting device, reflects off of the first moveable optical redirecting device, reflects off of the second moveable optical redirecting device, reflects off of a second wavelength selective optical redirecting device, and enters an optical output channel.

9. A method in accordance with claim 8, wherein the step of directing a first monitor beam in a forward direction along at least a portion of the optical path comprises the step of:
tapping the first monitor beam into the optical input channel.

10. A method in accordance with claim 8, wherein the step of directing a first monitor beam in a forward direction along at least a portion of the optical path comprises the step of:
transmitting at least a portion of the first monitor beam through the first wavelength selective optical redirecting device in a direction towards the first moveable optical redirecting device.

11. A method in accordance with claim 10, wherein the step of directing a first monitor beam in a forward direction along at least a portion of the optical path further comprises the step of:
directing the first monitor beam to the first wavelength selective optical redirecting device with a beam splitter.

12. A method in accordance with claim 10, wherein the step of directing a first monitor beam in a forward direction along at least a portion of the optical path further comprises the steps of:
providing a detector capable of receiving the first monitoring signal transmitted through the second wavelength selective optical redirecting device;
transmitting at least a portion of the first monitoring beam through the second wavelength selective optical redirecting device such that the transmitted portion of the first monitoring beam impinges upon the detector array.

13. A method in accordance with claim 8, wherein the step of directing a second monitor beam in a reverse direction along the at least a portion of the optical path comprises the step of:
tapping the second monitor beam into the optical output channel.

14. A method in accordance with claim 8, wherein the step of directing a second monitor beam in a reverse direction along the at least a portion of the optical path comprises the step of:
transmitting at least a portion of the second monitor beam through the second wavelength selective optical redirecting device in a direction towards the second moveable optical redirecting device.

15. A method in accordance with claim 14, wherein the step of directing a second monitor beam in a reverse direction along the at least a portion of the optical path further comprises the step of:
directing the second monitor beam to the second wavelength selective optical redirecting device with a beam splitter.

16. A method in accordance with claim 1, wherein the step of directing a second monitor beam in a reverse direction along the at least a portion of the optical path comprises the step of:
at least partially reflecting the first monitor beam directly backwards to form the second monitor beam.

17. A method in accordance with claim 16, wherein the step of at least partially reflecting the first monitor beam directly backwards to form the second monitor beam comprises the step of:
at least partially reflecting the first monitor beam directly backwards with a beam splitter positioned in front of a detector used to detect the position of the first monitor beam.

18. A method of switching an optical input channel to an optical output channel, comprising the steps of:
directing a light beam that originates from the optical input channel toward a first moveable optical redirecting device;
reflecting the light beam off of the first moveable optical redirecting device and onto a second moveable optical redirecting device;
reflecting the light beam off of the second moveable optical redirecting device;
directing the light beam reflected off of the second moveable optical redirecting device into the optical output channel; and
directing a first monitor beam along at least a portion of a same path traveled by the light beam.

19. A method in accordance with claim 18, further comprising the step of:
detecting a position of the first monitor beam after it is reflected off of the second moveable optical redirecting device.

20. A method in accordance with claim 18, further comprising the step of:
directing a second monitor beam along the at least a portion of the same path traveled by the light beam in a reverse direction.

21. A method in accordance with claim 20, further comprising the step of:
detecting a position of the second monitor beam after it is reflected off of the first moveable optical redirecting device.

22. A method in accordance with claim 18, wherein the each of the first and second moveable optical redirecting devices comprises a moveable optical redirecting device that is moveable in two dimensions.

23. A method in accordance with claim 18, wherein the step of directing the light beam reflected off of the second moveable optical redirecting device into the optical output channel comprises the step of:

reflecting the light beam off of a first wavelength selective optical redirecting device and into the optical output channel.

24. A method in accordance with claim 23, further comprising the step of:

transmitting at least a portion of the first monitor beam through the first wavelength selective optical redirecting device.

25. A method in accordance with claim 23, wherein the step of directing a first monitor beam along at least a portion of the same path traveled by the light beam further comprises the steps of:

providing a detector capable of receiving the first monitoring signal transmitted through the second wavelength selective optical redirecting device;

transmitting at least a portion of the first monitoring beam through the second wavelength selective optical redirecting device such that the transmitted portion of the first monitoring beam impinges upon the detector array.

26. A method in accordance with claim 18, wherein the step of directing a light beam that originates from the optical input channel toward a first moveable optical redirecting device comprises the step of:

reflecting the light beam off of a first wavelength selective optical redirecting device and onto the first moveable optical redirecting device.

27. A method in accordance with claim 26, further comprising the steps of:

directing a second monitor beam along the at least a portion of the same path traveled by the light beam in a reverse direction; and transmitting at least a portion of the second monitor beam through the first wavelength selective optical redirecting device.

28. A method in accordance with claim 18, further comprising the step of:

at least partially reflecting the first monitor beam directly backwards so that the partially reflected first monitor beam travels in a reverse direction along the at least a portion of the same path traveled by the light beam.

29. A method in accordance with claim 28, wherein the step of at least partially reflecting the first monitor beam directly backwards comprises the step of:

at least partially reflecting the first monitor beam directly backwards with a beam splitter positioned in front of a detector used to detect the position of the first monitor beam.

30. A method of switching an optical input channel to an optical output channel, comprising the steps of:

directing a light beam received from the optical input channel toward a first wavelength selective optical redirecting device;

reflecting the light beam off of the first wavelength selective optical redirecting device and onto a first moveable optical redirecting device;

adjusting the first moveable optical redirecting device so that the light beam reflects therefrom and impinges upon a second moveable optical redirecting device;

adjusting the second moveable optical redirecting device so that the light beam reflects therefrom and impinges upon a second wavelength selective optical redirecting device; and reflecting a first portion of the light beam off of the second wavelength selective optical redirecting device and into the optical output channel and coupling a second portion of the light beam to a detector via the second wavelength selective optical redirecting device.

31. A method in accordance with claim 30, further comprising the step of:

directing a first monitor beam along a same path traveled by the light beam between the first wavelength selective optical redirecting device and the second wavelength selective optical redirecting device.

32. A method in accordance with claim 31, further comprising the step of:

transmitting at least a portion of the first monitor beam through the second wavelength selective optical redirecting device.

33. A method in accordance with claim 32, further comprising the step of:

detecting a position of the transmitted portion of the first monitor beam.

34. A method in accordance with claim 33, wherein the step of detecting further comprises the step of:

detecting a position of the transmitted portion of the first monitor beam with a planar array of detectors that is positioned substantially parallel to the optical output channel.

35. A method in accordance with claim 31, further comprising the step of:

directing a second monitor beam along the same path in a reverse direction.

36. A method in accordance with claim 35, further comprising the step of:

transmitting at least a portion of the second monitor beam through the first wavelength selective optical redirecting device.

37. A method in accordance with claim 36, further comprising the step of:

detecting a position of the transmitted portion of the second monitor beam.

38. A method in accordance with claim 30, wherein the each of the first and second moveable optical redirecting devices comprises a moveable optical redirecting device that is moveable in two dimensions.

39. A method in accordance with claim 30, wherein the first moveable optical redirecting device is embodied in a first array of moveable optical redirecting devices with the first moveable optical redirecting device corresponding to the optical input channel.

40. A method in accordance with claim 30, wherein the second moveable optical redirecting device is embodied in a second array of moveable optical redirecting devices with the second moveable optical redirecting device corresponding to the optical output channel.

41. A method in accordance with claim 30, wherein the first wavelength selective optical redirecting device is positioned to form an approximately forty-five degree angle with the optical input channel, and the second wavelength selective optical redirecting device is positioned to form an approximately forty-five degree angle with the optical output channel.

42. A method in accordance with claim 41, wherein the first moveable optical redirecting device is embodied in a first array of moveable optical redirecting devices that is substantially parallel to the first wavelength selective optical redirecting device, and the second moveable optical redirecting device is embodied in a second array of moveable optical redirecting devices that is substantially parallel to the second wavelength selective optical redirecting device.

43. A method in accordance with claim 30, wherein the optical input channel is embodied in an array of optical input channels, and the optical output channel is embodied in an array of optical output channels.

44. An apparatus for use in optical switching, comprising:
a first switch module that includes
an optical input channel,
a first moveable optical redirecting device, and
a first wavelength selective optical redirecting device positioned to reflect a light beam received from the optical input channel onto the first moveable optical redirecting device, and
a first detector capable of receiving at least a portion of a light beam passing through the first wavelength selective optical redirecting device; and
a second switch module that includes an optical output channel, a second moveable optical redirecting device, and a second wavelength selective optical redirecting device positioned to reflect the light beam received from the second moveable optical redirecting device into the optical output channel;
wherein the first switch module and the second switch module are positioned so that the light beam can be reflected from the first moveable optical redirecting device and impinge upon the second moveable optical redirecting device.

45. An apparatus in accordance with claim 44, further comprising:
means for directing a first monitor beam along a same path traveled by the light beam that includes reflection off of the first moveable optical redirecting device and the second moveable optical redirecting device.

46. An apparatus in accordance with claim 45, wherein the second wavelength selective optical redirecting device comprises optical properties such that at least a portion of the first monitor beam is transmitted therethrough.

47. An apparatus in accordance with claim 46, further comprising:
a first detector configured to detect a position of the transmitted portion of the first monitor beam.

48. An apparatus in accordance with claim 45, further comprising:
means for directing a second monitor beam along the same path in a reverse direction.

49. An apparatus in accordance with claim 48, wherein the first wavelength selective optical redirecting device comprises optical properties such that at least a portion of the second monitor beam is transmitted therethrough.

50. An apparatus in accordance with claim 49, further comprising:
a second detector configured to detect a position of the transmitted portion of the second monitor beam.

51. An apparatus in accordance with claim 45, wherein the means for directing a first monitor beam comprises:
a wavelength selective device for tapping the first monitor beam into the optical input channel.

52. An apparatus in accordance with claim 45, wherein the means for directing a first monitor beam comprises:
a beam splitter configured to direct the first monitor beam toward the first wavelength selective optical redirecting device so that at least a portion of the first monitoring beam is transmitted therethrough.

53. An apparatus in accordance with claim 45, wherein the second switch module further comprises:
means for at least partially reflecting the first monitor beam directly backwards so that the partially reflected first monitor beam travels in a reverse direction along the same path.

54. An apparatus in accordance with claim 53, wherein the means for at least partially reflecting the first monitor beam directly backwards comprises:
a beam splitter positioned in front of a detector used to detect a position of the first monitor beam.

55. An apparatus in accordance with claim 44, wherein each of the first and second moveable optical redirecting devices comprises a moveable optical redirecting device that is moveable in two dimensions.

56. An apparatus in accordance with claim 44, wherein the first moveable optical redirecting device is embodied in a first array of moveable optical redirecting devices with the first moveable optical redirecting device corresponding to the optical input channel.

57. An apparatus in accordance with claim 44, wherein the second moveable optical redirecting device is embodied in a second array of moveable optical redirecting devices with the second moveable optical redirecting device corresponding to the optical output channel.

58. An apparatus in accordance with claim 44, wherein the first wavelength selective optical redirecting device is positioned to form an approximately forty-five degree angle with the optical input channel, and the second wavelength selective optical redirecting device is positioned to form an approximately forty-five degree angle with the optical output channel.

59. An apparatus in accordance with claim 58, wherein the first moveable optical redirecting device is embodied in a first array of moveable optical redirecting devices that is substantially parallel to the first wavelength selective optical redirecting device, and the second moveable optical redirecting device is embodied in a second array of moveable optical redirecting devices that is substantially parallel to the second wavelength selective optical redirecting device.

60. An apparatus in accordance with claim 44, wherein the optical input channel is embodied in an array of optical input channels, and the optical output channel is embodied in an array of optical output channels.

61. An apparatus for use in optical switching, comprising:
a first switch module that includes,
an optical input channel;
a first moveable optical redirecting device;
a first wavelength selective optical redirecting device positioned to reflect a light beam received from the optical input channel onto the first moveable optical redirecting device; and
a detector configured to detect a position of a first monitor beam that is reflected off of the first moveable optical redirecting device and that at least a portion of which is transmitted through the first wavelength selective optical redirecting device.

62. An apparatus in accordance with claim 61, further comprising:
means for directing a second monitor beam along a same path traveled by the first monitor beam and in an opposite direction.

63. An apparatus in accordance with claim 62, wherein the means for directing a second monitor beam comprises:
a tap configured to tap the second monitor beam into the optical input channel.

64. An apparatus in accordance with claim 62, wherein the means for directing a first monitor beam comprises:
a beam splitter configured to direct the second monitor beam toward the first wavelength selective optical redirecting device so that at least a portion of the second monitoring beam is transmitted therethrough.

65. An apparatus in accordance with claim 64, further comprising a detector positioned to receive at least a portion of the second monitoring beam that is transmitted through the first wavelength selective optical redirecting device.

66. An apparatus in accordance with claim 61, wherein the first moveable optical redirecting device comprises a moveable optical redirecting device that is moveable in two dimensions.

67. An apparatus in accordance with claim 61, wherein the first moveable optical redirecting device is embodied in a first array of moveable optical redirecting devices with the first moveable optical redirecting device corresponding to the optical input channel.

68. An apparatus in accordance with claim 61, wherein the first wavelength selective optical redirecting device is positioned to form an approximately forty-five degree angle with the optical input channel.

69. An apparatus in accordance with claim 68, wherein the first moveable optical redirecting device is embodied in a first array of moveable optical redirecting devices that is substantially parallel to the first wavelength selective optical redirecting device.

70. An apparatus in accordance with claim 61, wherein the optical input channel is embodied in an array of optical input channels.

71. An apparatus in accordance with claim 61, further comprising:

a second switch module that includes an optical output channel, a second moveable optical redirecting device, and a second wavelength selective optical redirecting device positioned to reflect the light beam received from the second moveable optical redirecting device into the optical output channel;

wherein the first switch module and the second switch module are positioned so that the light beam can be reflected from the first moveable optical redirecting device and impinge upon the second moveable optical redirecting device.

* * * * *